US007673929B2

(12) United States Patent
Patzer et al.

(10) Patent No.: US 7,673,929 B2
(45) Date of Patent: Mar. 9, 2010

(54) HINGE WITH A VISCOUS ROTARY DAMPER

(75) Inventors: Brad F. Patzer, Barrie (CA); Michael D. J. Smith, Aurora (CA); Stanislav Magovski, Hamilton (CA); David W. Shaw, Richmond Hill (CA); Joaquin Hung, Markham (CA)

(73) Assignee: Ventra Group, Inc., Ontario (CA)

( * ) Notice: Subject to any disclaimer, the term of this patent is extended or adjusted under 35 U.S.C. 154(b) by 0 days.

(21) Appl. No.: 12/240,082

(22) Filed: Sep. 29, 2008

(65) Prior Publication Data

US 2009/0096246 A1 Apr. 16, 2009

Related U.S. Application Data

(60) Provisional application No. 60/978,910, filed on Oct. 10, 2007.

(51) Int. Cl.
*B60J 5/00* (2006.01)

(52) U.S. Cl. ................................ 296/146.11; 296/57.1

(58) Field of Classification Search ............ 296/146.11, 296/37.7; 16/82; 188/290, 322.5; 192/208, 192/213.2; 464/68.3; 4/236

See application file for complete search history.

(56) References Cited

U.S. PATENT DOCUMENTS 3,952,365 A 4/1976 Grisebach
4,672,715 A 6/1987 Beckwith
4,953,259 A 9/1990 Frye
5,084,939 A 2/1992 Garman
5,207,620 A * 5/1993 Yamamoto et al. .......... 474/135
5,358,301 A * 10/1994 Konchan et al. ......... 296/146.1
5,497,863 A 3/1996 Schmidt
5,635,655 A * 6/1997 Yamashita .................. 84/179
5,720,370 A 2/1998 Takahashi
5,743,575 A 4/1998 McFarland (Continued)

FOREIGN PATENT DOCUMENTS

CA 2302847 C 10/2000

(Continued)

OTHER PUBLICATIONS

International Search Report and Written Opinion for PCT International patent application No. PCT/IB2008/054184, mailed on May 13, 2009.

*Primary Examiner*—Kiran B. Patel
(74) *Attorney, Agent, or Firm*—Pillsbury Winthrop Shaw Pittman LLP

(57) ABSTRACT

An assembly to pivotally connect an external vehicle closure panel to a vehicle body includes a first hinge member that is constructed to be mounted to one of the external vehicle closure panel and the vehicle body, a second hinge member that is constructed to be mounted to the other of the external vehicle closure panel and the vehicle body, a shaft that is constructed to pivotally connect the first hinge member to the second hinge member, and a viscous rotary damper. The damper includes a cover, a rotor, and a viscous material. The shaft connects to the rotor such that rotation of the external vehicle closure panel between a closing position and an opening position causes relative motion between the rotor and the cover of the viscous damper to provide a resistance for controlling the velocity of the external vehicle closure member.

8 Claims, 20 Drawing Sheets

U.S. PATENT DOCUMENTS

| | | | | |
|---|---|---|---|---|
| 5,887,930 | A | 3/1999 | Klein | |
| 5,979,592 | A | 11/1999 | Delgado | |
| 6,085,384 | A | 7/2000 | Bivens | |
| 6,158,088 | A | 12/2000 | Bulboaca | |
| 6,773,047 | B2 * | 8/2004 | Gruber | 296/57.1 |
| 6,840,356 | B2 | 1/2005 | Nishiyama | |
| 6,874,837 | B2 * | 4/2005 | Bruford et al. | 296/146.11 |
| 6,904,642 | B2 | 6/2005 | West | |
| 7,051,618 | B2 | 5/2006 | Anton | |
| 7,066,308 | B2 | 6/2006 | Kanno | |
| 7,213,858 | B2 * | 5/2007 | Smith | 296/57.1 |
| 7,243,398 | B2 | 7/2007 | Salice | |
| 7,287,799 | B2 * | 10/2007 | Austin | 296/57.1 |
| 7,500,706 | B2 * | 3/2009 | Anderson et al. | 296/57.1 |
| 7,533,920 | B2 * | 5/2009 | Ohly | 296/146.11 |
| 7,556,305 | B2 * | 7/2009 | Stratten | 296/57.1 |
| 2001/0007163 | A1 | 7/2001 | Alonso | |
| 2002/0078529 | A1 | 6/2002 | Schwarz | |
| 2004/0103746 | A1 | 6/2004 | Anton | |
| 2006/0249343 | A1 * | 11/2006 | Prottengeier et al. | 188/381 |
| 2006/0272129 | A1 | 12/2006 | Rude | |
| 2007/0096492 | A1 | 5/2007 | Austin | |
| 2007/0145761 | A1 | 6/2007 | Eshenbach | |
| 2007/0152471 | A1 * | 7/2007 | Zagoroff | 296/146.4 |
| 2007/0193840 | A1 | 8/2007 | Kanno | |
| 2008/0197651 | A1 | 8/2008 | Stratten | |
| 2008/0284193 | A1 | 11/2008 | Gleason | |
| 2009/0096246 | A1 * | 4/2009 | Patzer et al. | 296/146.11 |

FOREIGN PATENT DOCUMENTS

| | | |
|---|---|---|
| EP | 978 615 | 7/1999 |
| EP | 1 650 468 | 4/2006 |
| EP | 1 413 794 | 2/2007 |
| JP | 3-139427 | 6/1991 |
| JP | 2006-77897 | 3/2006 |
| JP | 2006064122 A | 3/2006 |
| WO | 2007029441 A1 | 3/2008 |

* cited by examiner

HINGE WITH A VISCOUS ROTARY DAMPER

The present application claims priority to U.S. Provisional Application Ser. No. 60/978,910, filed on Oct. 10, 2007, the entirety of which is hereby incorporated herein.

BACKGROUND OF THE INVENTION

1. Field of the Invention

The present invention relates to a viscous rotary damper that is applied to a hinge of an automotive closure system such as tailgates, doors, trunks, liftgates, decklids, etc.

2. Description of Related Art

Current entry/exit door systems in an automobile often use mechanical devices to provide soft stop locations or checks between a fully open position and a fully closed position, and a hard stop at the fully open position. However, the operation of these mechanical devices may be perceived to be "harsh" by the end user. It is especially difficult to control the door bounce back from the fully open hard stop location by using these mechanical devices. When the end user opens the door and moves the door into the fully open position, the system does not readily absorb the energy of the door moving in the opening direction, and thus the door may tend aggressively to bounce back onto the end user.

Current hood, trunk, liftgate and tailgate systems in an automobile typically use strut systems to provide open assist and velocity control. However, these strut systems are more expensive (typically requiring two struts per hood, trunk, liftgate or tailgate). See, e.g., U.S. Pat. No. 6,994,390. These strut systems are large, require more packaging space within the vehicle and can potentially cause pinch points to the end user. These strut systems may also be subject to significant performance changes due to changes in the temperature. For example, these strut systems provide low or inadequate assist at low temperatures and provide high or excessive assist at higher temperatures. These strut systems also require additional structural support mechanisms (such as body reinforcements) and supplemental attaching features (such as ball studs).

Viscous dampers are used in the automotive industry, for example, to provide rotational resistance on a hinge shaft of an opening-closing member, such as a console box or a glove box, so that the opening-closing member is not suddenly closed or opened (e.g., see U.S. Pat. Nos. 5,497,863; 5,887,930; 6,085,384; 6,840,356 B2; and 7,066,308 B2). These viscous dampers are too small for the hinge systems that are used in other automotive closures systems, such as tailgates, doors, trunks, liftgates or decklids, which require resistance torque in the range of 15 to 25 Nm. The viscous dampers that produce the required resistance torque are larger in size and cannot meet the limited space requirements for the hinge systems.

Additional references of interest include U.S. Pat. Nos. 3,952,365; 5,084,939; 5,979,592; and 7,051,618 B2; U.S. Patent Pub. Nos. 2001/0007163 A1 and 2004/0103746 A1; EP 01413794 B1; EP 01650468 A1; EP 00978615 B1; and JP 03139427.

SUMMARY

One aspect of the invention relates to an assembly to pivotally connect an external vehicle closure panel to a vehicle body. The assembly comprising a first hinge member, a second hinge member, a shaft, and a viscous rotary damper. The first hinge member is constructed to be mounted to one of the external vehicle closure panel and the vehicle body. The second hinge member is constructed to be mounted to the other of the external vehicle closure panel and the vehicle body. The shaft is constructed to pivotally connect the first hinge member to the second hinge member. The viscous damper comprises a cover, a rotor, and a viscous material. The cover is constructed to fixedly connect the viscous damper to one of the first hinge member and the second hinge member. The rotor is rotatably supported within the cover. The viscous material is disposed in a space between the cover and the rotor. The shaft connects to the rotor such that rotation of the external vehicle closure panel between a closing position and an opening position causes relative motion between the rotor and the cover of the viscous damper to provide a resistance for controlling the velocity of the external vehicle closure member.

Another aspect of the invention relates to an assembly to pivotally connect a tailgate to a vehicle body. The assembly comprising a viscous rotary damper, and a pair of hinge mechanisms on opposing sides of the tailgate. The hinge mechanisms are constructed to be pivotally mounted to the tailgate for the movement about a pivot axis between a raised closed position extending generally vertically and a lowered open position extending generally horizontally. The at least one of the pair of hinge mechanisms comprises a first hinge member, a second hinge member, a connection member, and a support member on the second hinge member. The first hinge member is constructed to be mounted to the tailgate. The second hinge member is constructed to be mounted to the vehicle body. The connection member is constructed to connect to the tailgate and to pivot with the shaft, and to connect with the viscous damper. The support member is constructed to pivotally receive the connection member so as to allow the connection member to pivot with the tailgate, thus allowing for pivotal movement of the tailgate and support its weight. The viscous damper comprises a cover, a rotor, and a viscous material. The cover is constructed to be fixed relative to the second hinge member. The rotor is rotatably supported within the cover. The viscous material is disposed in a space between the cover and the rotor. The connection member connects to the rotor to enable rotation of the tailgate between the closed position and the open position to rotate the rotor relative to the cover of the viscous damper to provide a resistance torque that controls the velocity of the tailgate.

Other aspects, features, and advantages of the present invention will become apparent from the following detailed description, and the accompanying drawings.

DETAILED DESCRIPTION OF THE INVENTION

Figure 1:
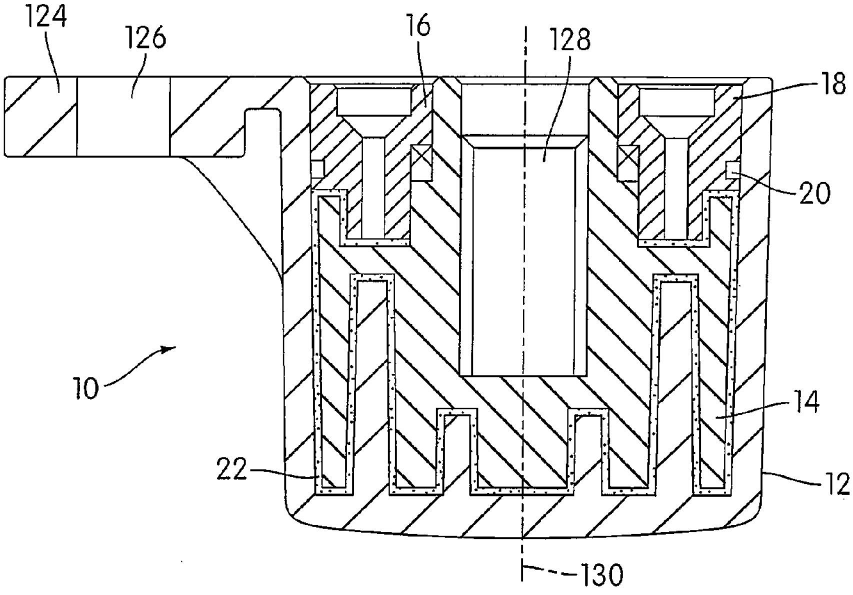
FIG. 1 is a cross-section view of a viscous damper used in an embodiment of the present invention.
Figure 2:
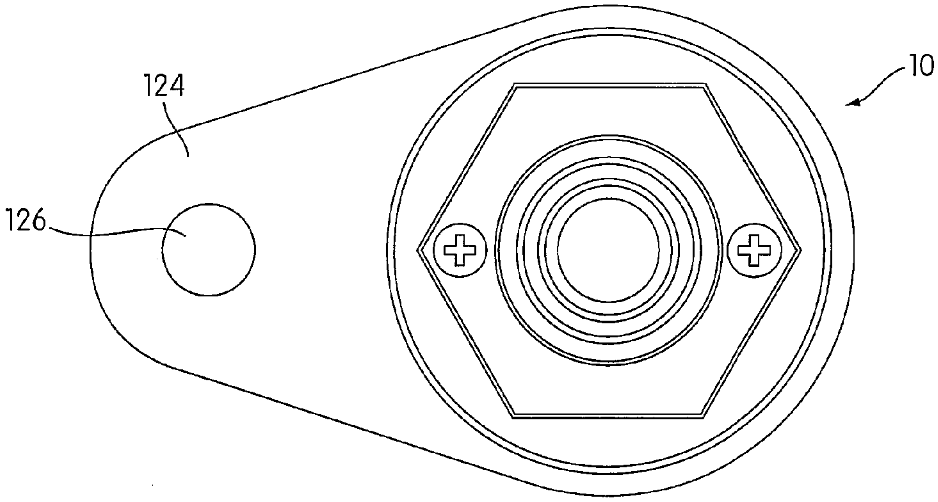
FIG. 2 is a top view of the viscous damper used in an embodiment of the present invention.

FIGS. 1 and 2 illustrate a rotary viscous damper constructed in accordance with one embodiment of the present invention. This viscous damper is provided only as an example to illustrate one way for constructing the invention, and should not be regarded as limiting.

As shown in FIGS. 1 and 2, the viscous damper 10 includes a cover 12, a rotor 14, a seal 16, a seal cover 18 and an o-ring seal 20. In one embodiment, the seal 16 may also be in the form of the o-ring 20. The cover 12 and the seal cover 18 may be considered an enclosed housing. The rotor 14 is rotatably supported within the cover 12 of the viscous damper 10 and a viscous material 22 is filled in the space between the cover 12 and the rotor 14. The seal cover 18 is fixed to the open end of the cover 12 and the seal 16 is placed between the rotor 14 and the inner edge of the seal cover 18. The o-ring 20 is disposed between the outer edge of the seal cover 18 and the cover 12. The seal 16, the seal cover 18 and the o-ring 20 prevent the leakage of the viscous material 22 from the viscous damper 10.

The cover 12 has an attachment member 124 extending outwardly from one side therefrom. The attachment member 124 has a bolt receiving opening 126 that allows the cover 12 to be attached to a movable automotive closure panel or a fixed body part. An opening 128 is located in the rotor 14 about its center axis 130 and the opening 128 receives a hinge pin of the automotive closure assembly. The central portion of the rotor 14 extends through the central opening of the seal cover 18, so that the opening 128 is accessible for this purpose.

The cover 12 is attached to the movable automotive closure panel (not shown) or a fixed body part (not shown) using a bolt (as can be clearly seen in FIGS. 3 and 4) that passes through the bolt receiving opening 126. When the damper 10 is mounted to the fixed body part, a hinge pin on the movable closure will be received in the rotor opening 128; and likewise when the damper 10 is mounted to the movable closure, a hinge pin on the fixed part will be received in the rotor opening 128. In other variations, the damper 10 may be mounted to two movable parts of a hinge system that is connected between the closure and the fixed body part without being connected directly to either the closure or the fixed body part.

When the movable automotive closure panel moves between an opening position and a closing position, a rotational force is transmitted to the center axis 130 that is attached to the hinge pin, and to the rotor 14. Therefore, the rotor 14 rotates and a relative motion is generated between the cover 12 and the rotor 14. The relative motion generates a damping force or a shear resistance (also referred to as a resistance torque). The shock of the automotive closure systems such as doors, tailgates, liftgates, trunks, decklids, etc. is absorbed by the resistance torque generated by the viscous damper 10.

The viscous material 22 preferably can be any suitable viscous flowable fluid such as silicone oil, silicone gel, etc. The viscous material 22 preferably has excellent temperature characteristics and exhibits stable characteristics at both low and high temperatures. The rotor 14 and the cover 12 may be fabricated from plastic material or from any other material as would be apparent to one skilled in the art.

The viscous damper 10 may also have one way or two way dampening directions. The design of a one way viscous damper is different from the design of a two way viscous damper. Typically, a one way damper is designed to provide significantly more damping effect in one rotary direction as opposed to the other; and a two way damper provides similar damping effect in both directions.

The sealing design of the viscous damper 10 is determined based on the viscous substance 22 that is used in the viscous damper 10. The viscous damper 10 generates the desired damping force in a limited space. The viscous damper 10 is cylindrical in shape. It should be appreciated, however, that this embodiment is but one example of different types of viscous damper shapes, configurations and/or constructions that can be provided.

Figure 13A:
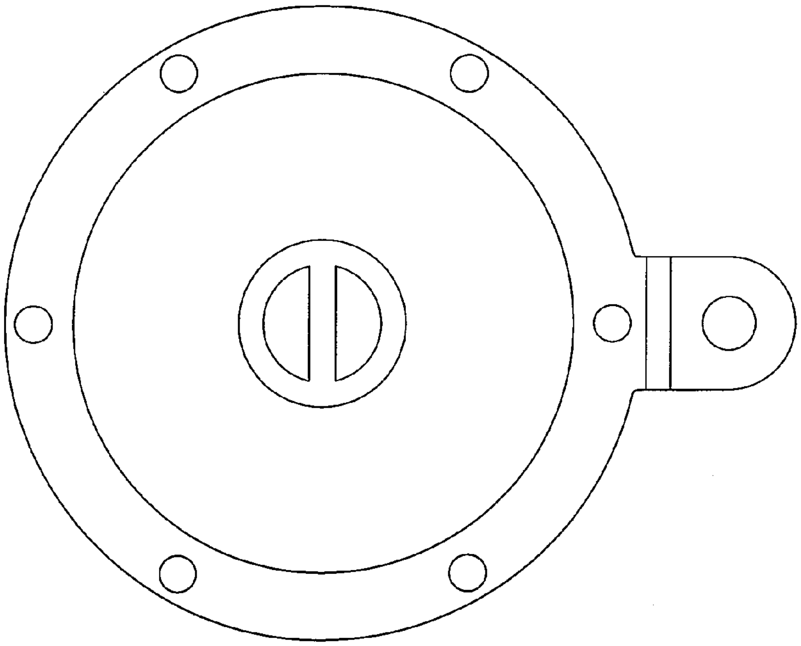
FIG. 13A shows a top view of an alternative configuration of the viscous damper in accordance with an embodiment of the present invention.
Figure 13B:
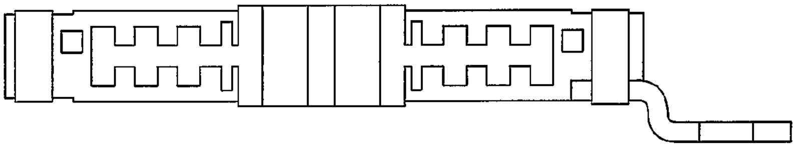
FIG. 13B shows a side view of the alternative configuration of the viscous damper in accordance with an embodiment of the present invention.

The illustrated damper 10 is available from Oiles America Corporation for use in reclining vehicle seats. Other rotary viscous dampers may be used. For example, the damper may be a sealed casing with two opposing disks with a thin fluid medium there between where relative rotation between the disks is resisted by the fluid. This is shown in FIGS. 13A and 13B.

Figure 14:
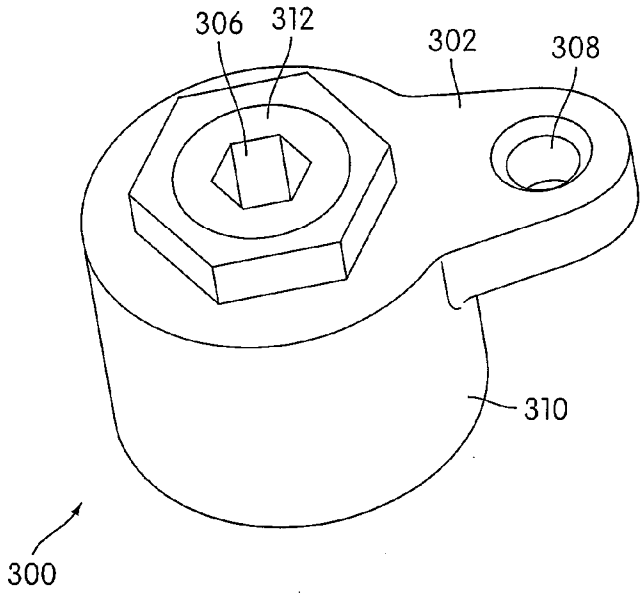
FIG. 14 shows another alternative configuration of the viscous damper in accordance with an embodiment of the present invention.
Figure 15:
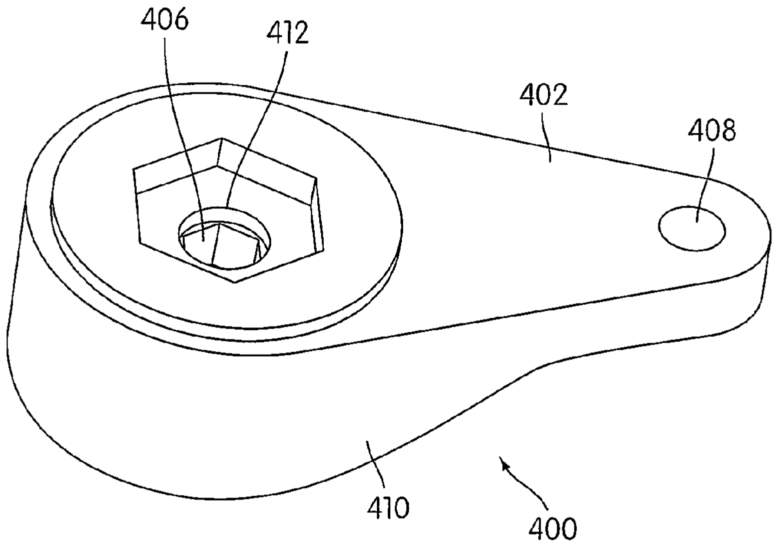
FIG. 15 shows another alternative configuration of the viscous damper in accordance with an embodiment of the present invention.
Figure 16:
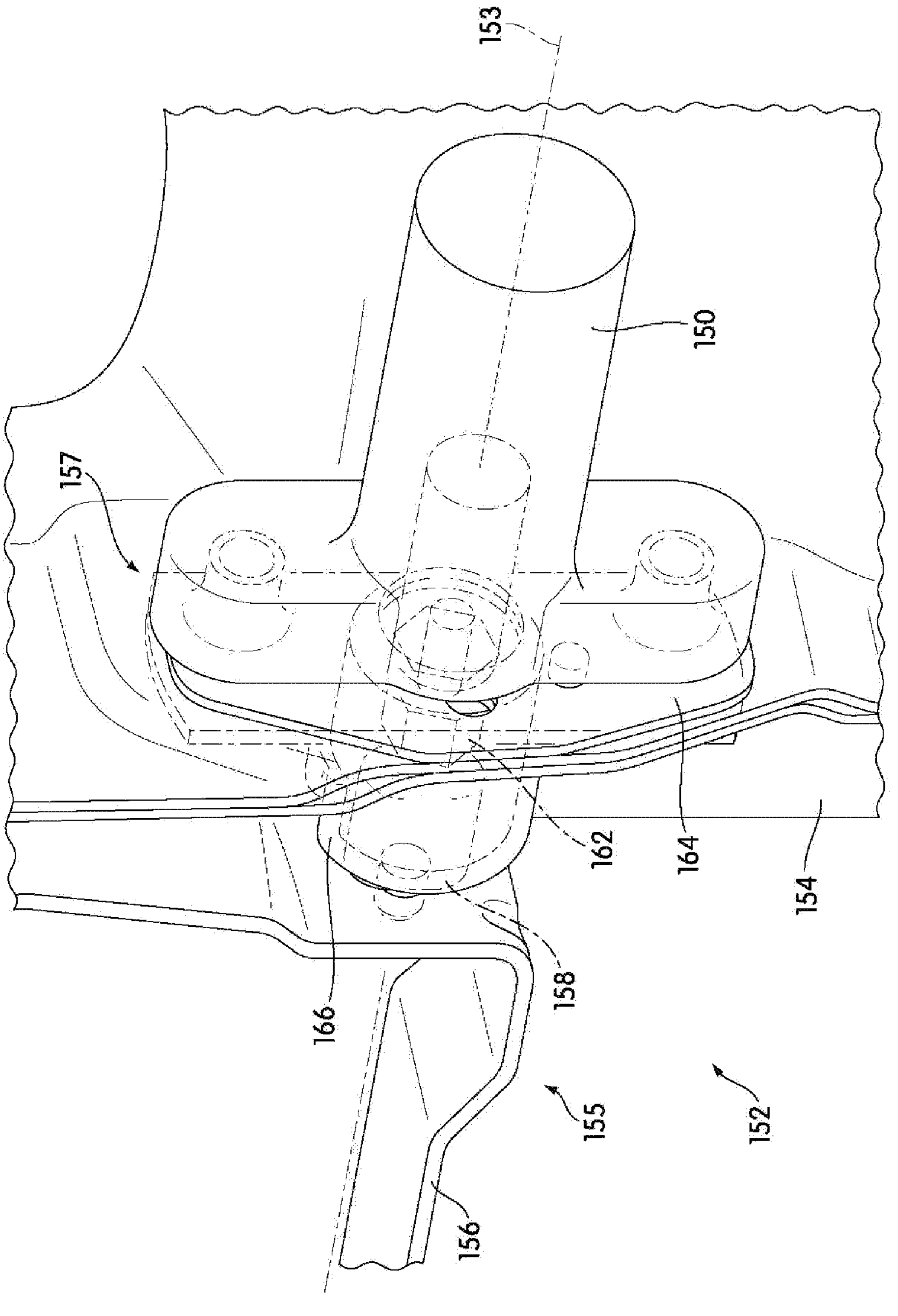
FIG. 16 is a right side perspective view of a viscous damper applied to a tailgate hinge in accordance with an embodiment of the present invention.

FIGS. 14 and 15 shows two different alternative configurations of the viscous damper 10. In the first configuration, the viscous damper 300 has an attachment member 302 extending outwardly from one side thereof. The attachment member 302 has a bolt receiving opening 308 that allows the cover 310 to be attached to a movable automotive closure panel or a fixed body part. An opening 306 is located in the rotor 312 about its center axis and the opening 306 receives a hinge pin of the automotive closure assembly. The central portion of the cover 310 and the rotor 312 of the viscous damper 300 protrude upwardly from the top of the viscous damper 300 so that the opening 306 is accessible for this purpose. The central portion of the cover also has a non-circular shape (shown as hexagonal), which may be received in a corresponding opening in a structure to which it is mounted to provide additional securement/stability. In the second configuration, the viscous damper 400 has an attachment member 402 extending outwardly from one side thereof. The attachment member 402 has a bolt receiving opening 408 that allows the cover 410 to be attached to a movable automotive closure panel or a fixed body part. In contrast to the viscous damper 300, the attachment member 402 of the viscous damper 400 is thicker than the attachment member 302 of the viscous damper 300. In illustrated embodiment, the viscous damper 400 comprises a recessed portion 412 that includes an opening 406, where opening 406 is constructed and arranged to receive a hinge pin of the automotive closure assembly. Thus, these configurations allow the dampers to be used in applications with different torque requirements. The recessed portion 412 also has a non-circular shape (shown as hexagonal) which may receive a corresponding projection on a structure to which it is mounted to provide additional securement/stability.

Figure 21:
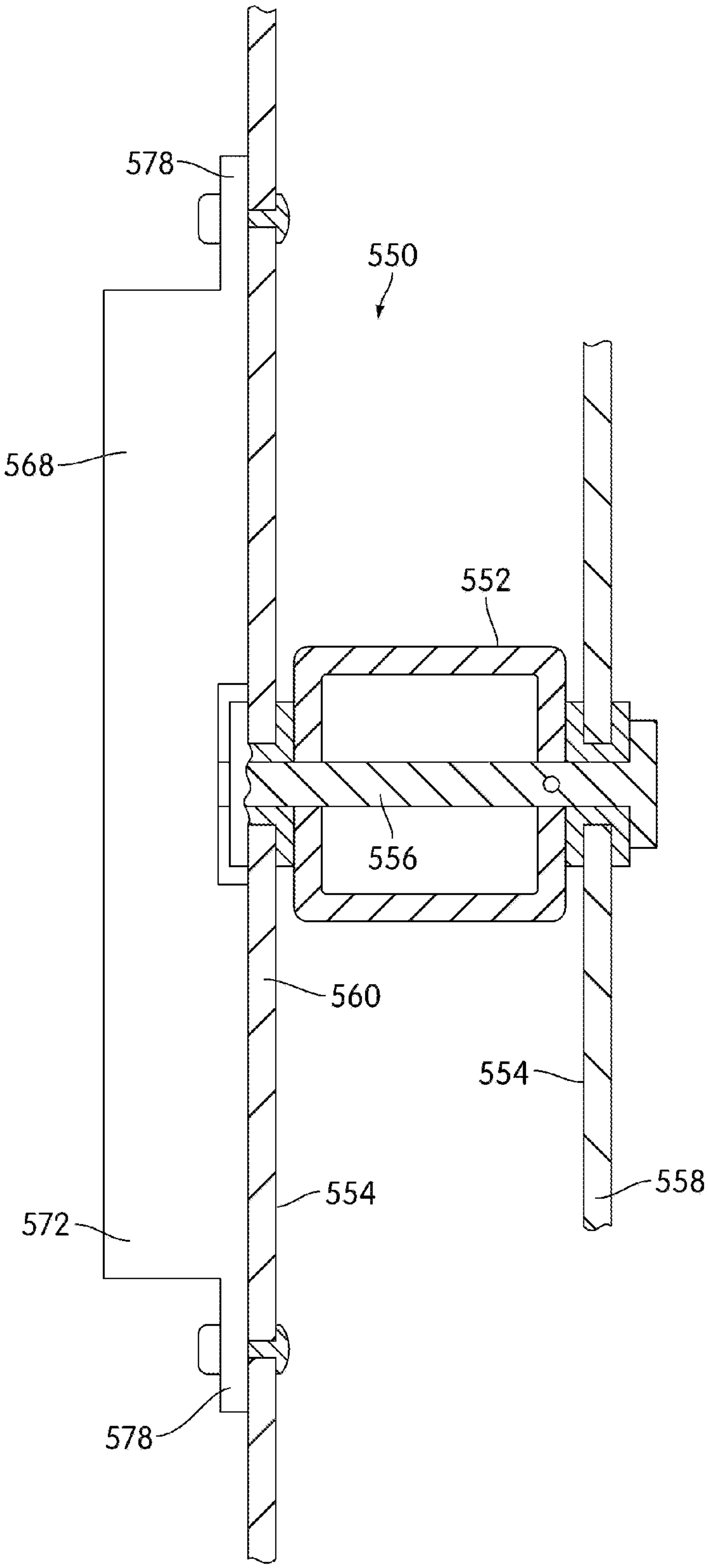
FIG. 21 is a cross-section view of a viscous damper applied to a decklid hinge in accordance with an embodiment of the present invention.
Figure 22:
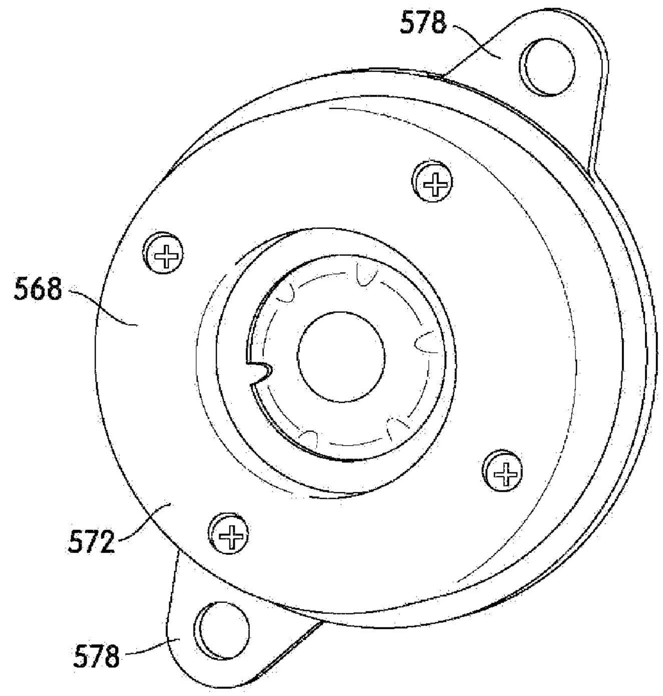
FIG. 22 shows another alternate configuration of a viscous damper in accordance with an embodiment of the present invention.
Figure 23:
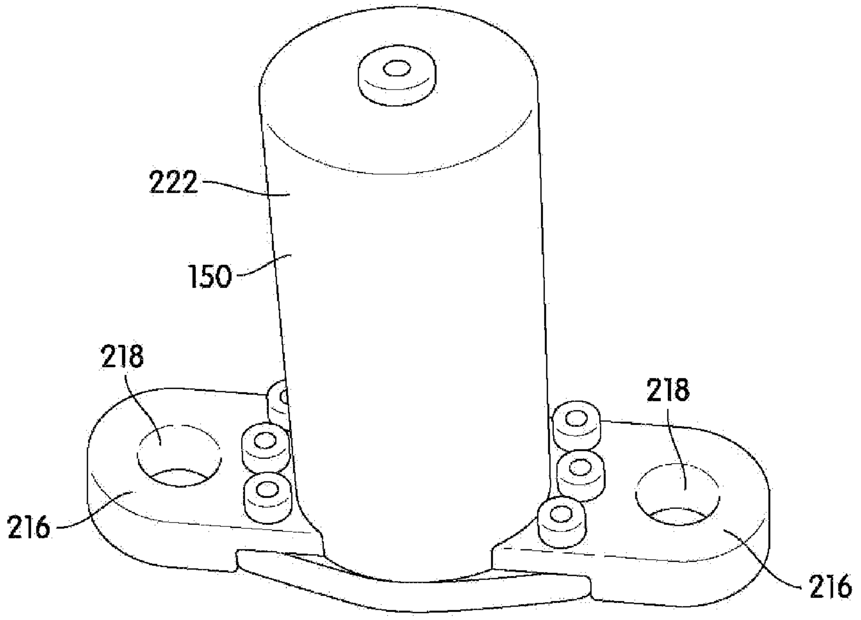
FIG. 23 shows another alternate configuration of a viscous damper in accordance with an embodiment of the present invention.

FIGS. 22 and 23 show two different alternative configurations of the rotary viscous damper. The structure and construction of viscous damper 568, shown in FIG. 22, is discussed in detail later with respect to FIG. 21 and the structure and construction of viscous damper 150, as shown in FIG. 23, is discussed in detail later with respect to FIGS. 16-20.

Figure 3:
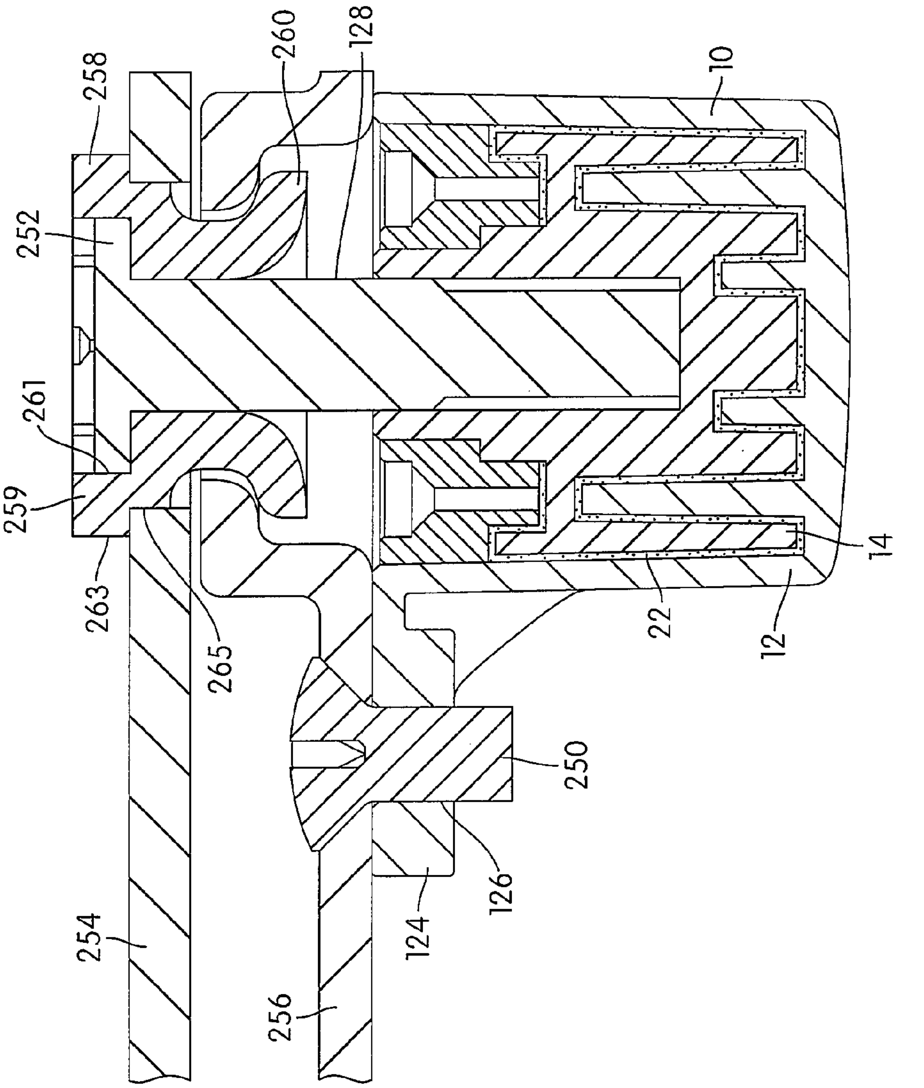
FIG. 3 is a cross sectional view of the viscous damper assembled with an automotive closure panel in accordance with an embodiment of the present invention.
Figure 4:
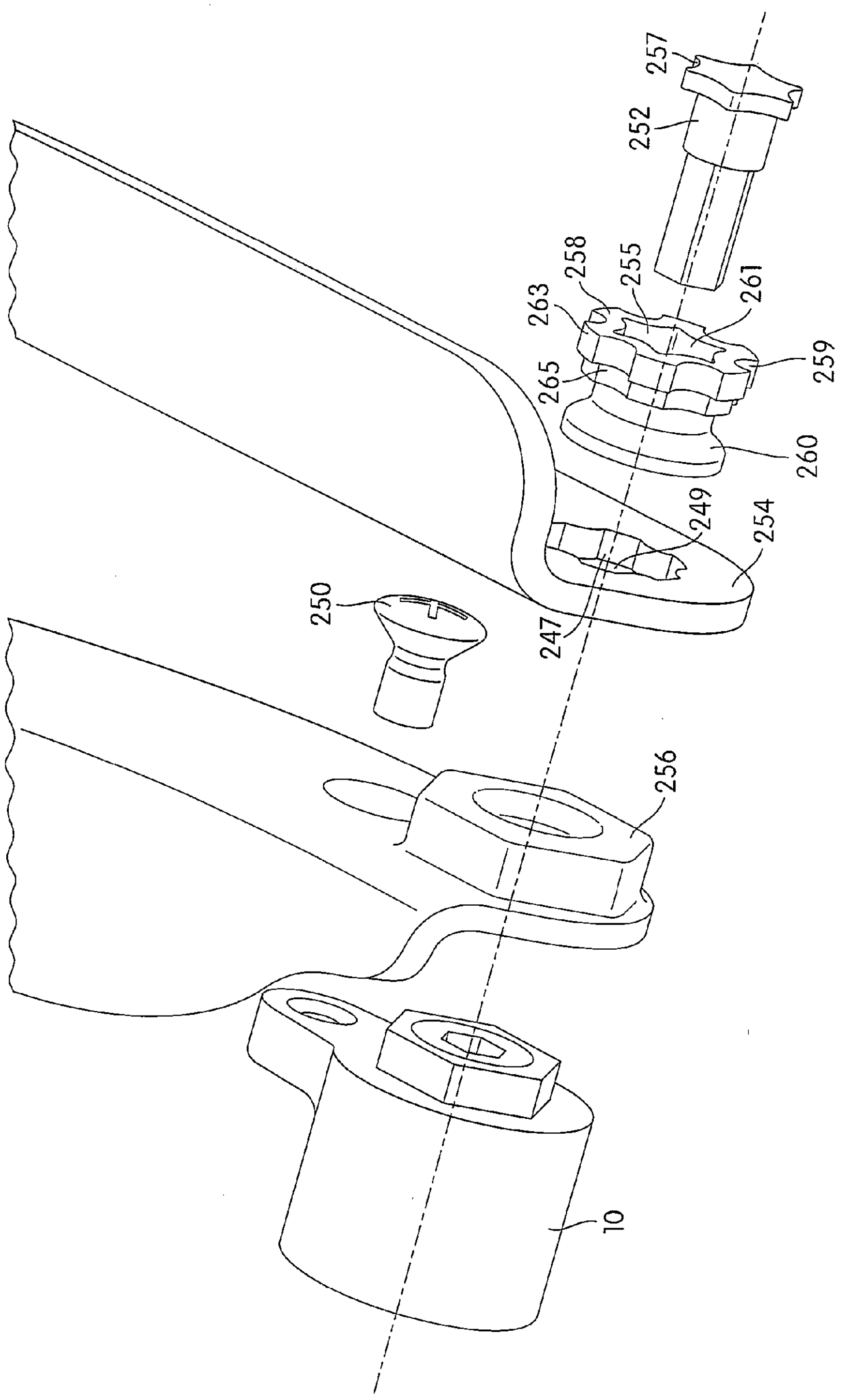
FIG. 4 is a perspective view of the viscous damper along with other components that are used to connect the viscous damper to the automotive closure panel in accordance with an embodiment of the present invention.

FIG. 3 shows a cross-sectional view of the viscous damper that is assembled with an automotive closure panel and FIG. 4 shows a perspective view of the viscous damper along with other members that are used to connect the viscous damper to the automotive closure panel. As shown in FIGS. 3 and 4, the viscous damper 10 includes the cover 12 and the rotor 14. As discussed above, the rotor 14 is rotatably supported within the cover 12 of the viscous damper 10 and a viscous material 22 is filled in the space between the cover 12 and the rotor 14. The cover 12 is attached to a fixed body part 256 using a bolt 250 that passes through the bolt receiving opening 126. When the damper 10 is mounted to the fixed body part 256 (as shown in FIG. 3), a pin 252 on the movable closure 254 will be received in the rotor opening 128.

A member 258 is used to connect the movable automotive closure panel 254 and the fixed body part 256, and to accommodate the hinge pin 252 in the central opening of the member 258. The member 258 acts a force absorbing member and may be made of metal or any suitable material. As shown in FIGS. 3 and 4, an upper end 259 of the member 258 has an inner surface 261 and an outer surface 263. The inner surface 261, of the upper end 259 of the member 258 defines a recess 255 for accommodating a head portion 257 of the hinge pin 252. The upper end or head 259 of the member 258 also has a recessed shoulder 265 that aligns with an opening 249 of the movable closure panel 254. In one embodiment, the head portion 257 of the hinge pin 252 is shaped and arranged to engage in a mating relationship with the inner surface 261 of the upper end 259 of the member 258 to prevent relative rotation between member 258 and the hinge pin 252. In the illustrated embodiment, the head portion 257 of the hinge pin 252 is shaped in the form of a hexagon with inwardly protruding surfaces and the inner surface 261 of the upper end 259 of the member 258 has a matching shape. It is should be appreciated that the illustrated embodiment is but one example of different shapes, constructions and/or constructions that can be provided. For example, the head portion 257 of the hinge pin 252 and the inner surface 261 of the upper end 259 of the member 258 may include, but not limited to, square-shaped, or diamond-shaped.

In one embodiment, the recessed shoulder 265 of the member 258 is also shaped and arranged to engage in a mating relationship with an inner surface 247 of the opening 249 of the movable closure panel 254 to prevent relative rotation between member 258 and the movable closure panel 254. In the illustrated embodiment, the recessed shoulder 265 of member 258 is shaped in the form of a hexagon with inwardly protruding surfaces and the inner surface 247 of the opening 249 of the movable closure panel 254 has a matching shape. It should be appreciated that the illustrated embodiment is but one example of different shapes, constructions and/or constructions that can be provided. The opening of the movable closure panel 254 supports the member 258 and also prevents the member 258 from moving further down into the assembly. The lower end 260 of the member 258 initially has a cylindrical wall. This cylindrical wall allows the member 258 to pass through the openings located in the movable closure panel 254 and in the fixed body part 256. Once the movable closure panel 254 is connected to the fixed body part 256, the cylindrical wall of the lower end 260 of the member 258 is radially expanded or flared outwardly as shown to secure the movable automotive closure panel 254 and the fixed body part 256 together. Also, in the embodiments of FIGS. 3 and 4, or any variation thereof, the structures pivotally connected as illustrated may be brackets that mount to the movable closure and the fixed body part, or they may integrally formed parts of the movable closure and the fixed body part.

As an alternative, the damper 10 and its cover 12 could be attached to the movable closure panel 254, and the hinge pin 252 would be connected to fixed body part 256 via member 258. Moreover, any suitable configuration or arrangement for assembling such components may be used. For example, the damper 10 may be connected between any two parts of a hinge system coupled between the fixed body part and the movable closure, and need not be directly coupled to the fixed body part and the movable closure panel.

FIGS. 5-12 and 16-21 show a viscous damper applied to a hinge that is designed for use in a motor vehicle (i.e. a car, truck, boat, etc.), and may be used to connect a movable panel to the vehicle body. The hinge is designed to connect a movable panel to a body for movement between open and closed positions of the movable panel. The viscous damper provides velocity control to control the closure panel bounce back from the fully open position. The viscous damper also readily absorb the energy of the closure panel moving in the opening direction, and thus reduces or eliminates aggressively closure panel bounce back from the fully open position. For convenience in putting the illustrated embodiments in context, references are made to the hinge's use in supporting a door, a tailgate, a hood, a liftgate or a trunk of a motor vehicle, but should be understood that the hinge may have other applications.

Figure 5:
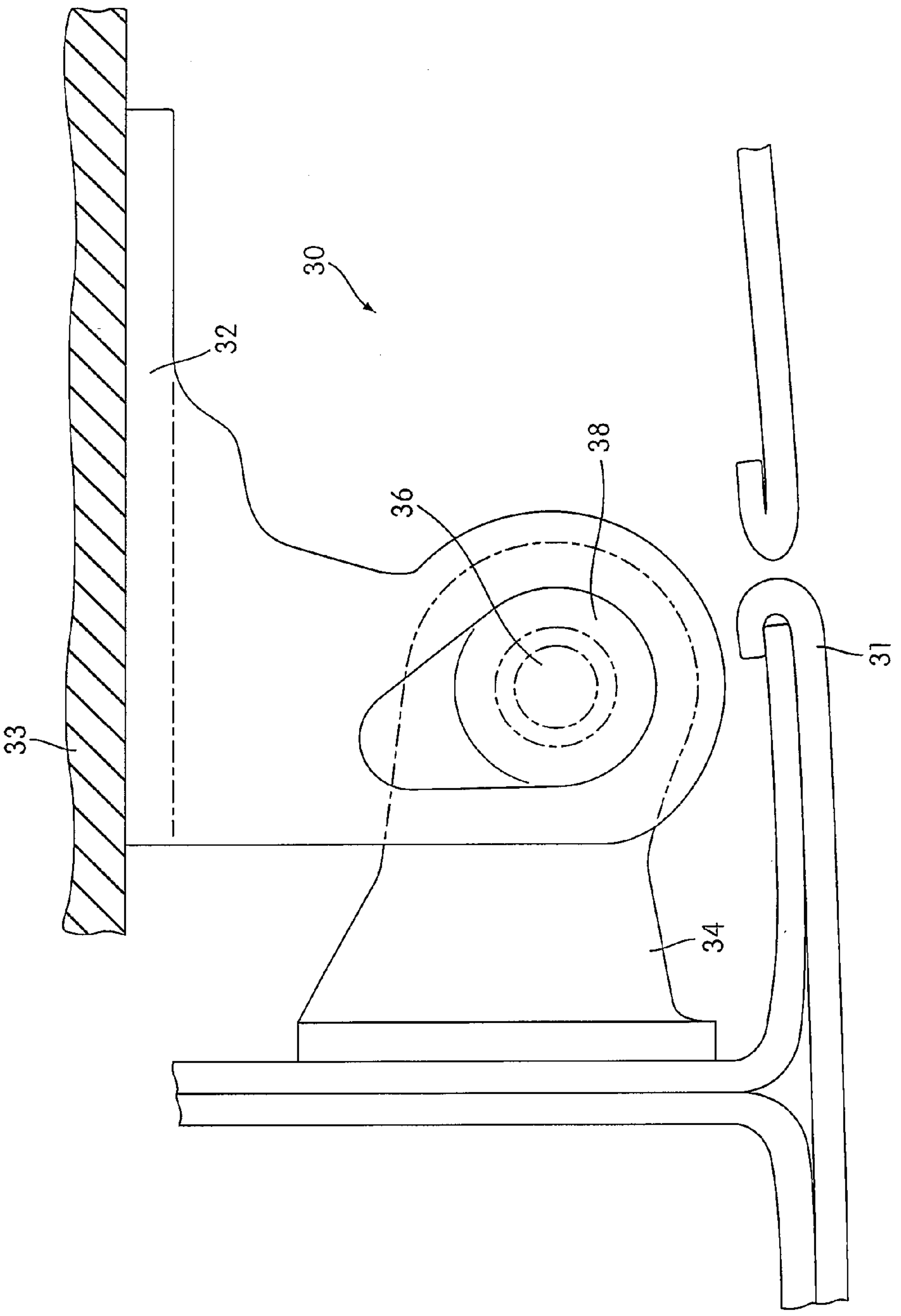
FIG. 5 is a top view of a viscous damper applied to a door hinge in accordance with an embodiment of the present invention.

FIG. 5 shows a viscous damper applied to a door hinge 30 in accordance with an embodiment of the invention. The hinge 30 hingedly connects a vehicle door 31 to the vehicle body 33 for movement about a generally vertical axis between open and closed positions. The hinge 30 comprises a body bracket 32 and a door bracket 34. The body bracket 32 is constructed to be mounted to the vehicle body 33, and the door bracket 34 is constructed to be mounted to the vehicle door panel 31. A hinge pin 36 pivotally connects the brackets 32, 34 to one another for opening and closing movements of the door. The hinge pin 36 is fixed to the door bracket 34, and therefore rotates as the door opens and closes. A viscous damper 38 has its rotor 14 fixed on the hinge pin 36 (e.g. by receipt in opening 128) and its cover 12 fixed to an arm of the body bracket 32. Thus, the rotor 14 moves with the hinge pin 36 and the door bracket 34 (while the cover 12 stays fixed on the body bracket 32), and the fluid 22 in the damper 38 helps control the velocity of the door. For example, a viscous damper having a structure and operation as described above can be used in the door hinge. The viscous damper 38 provides energy absorption and velocity control to counter the mechanical bounce back of the door.

Figure 6:
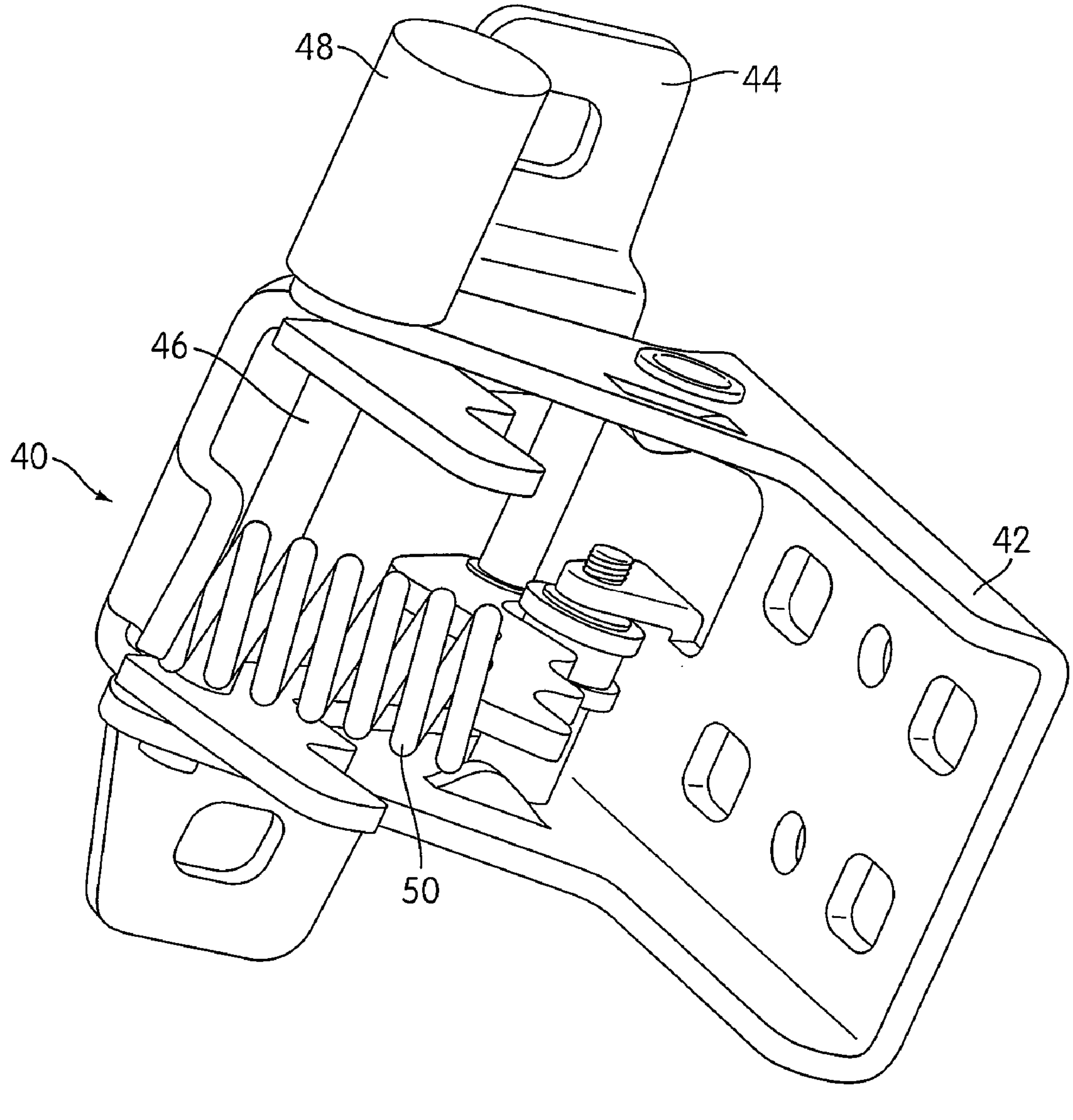
FIG. 6 is a perspective view of a viscous damper and door hinge with open assist mechanism in accordance with an embodiment of the present invention.

FIG. 6 shows a door hinge 40 that combines an integrated check mechanism in accordance with an embodiment of the invention. The hinge 40 hingedly connects a vehicle door (not shown) to the vehicle body (not shown) for movement between open and closed positions. The hinge 40 comprises a body bracket 42 and a door bracket 44. A hinge pin 46 pivotally connects the brackets 42, 44 to one another for opening and closing movements of the door, and is fixed to the door bracket 44. A viscous damper 48 is attached to the hinge pin 46 and the body bracket 42 in the same manner as the embodiment of FIG. 5 to control the velocity of the door. For example, a viscous damper having a structure and operation as described above can be used in the door hinge. The illustrated hinge 40 is of an integrated check type, meaning that a checking device 50 is provided as part of the hinge 40, and/but not as an entirely separate device from the hinge 40. The check device 50 provides one or more distinct checked positions for the door panel, as is known in the art. The checking device 50 of the hinge 40 is described in detail in the U.S. application Ser. No. 11/564,383, which is incorporated by reference herein in its entirety.

Figure 7:
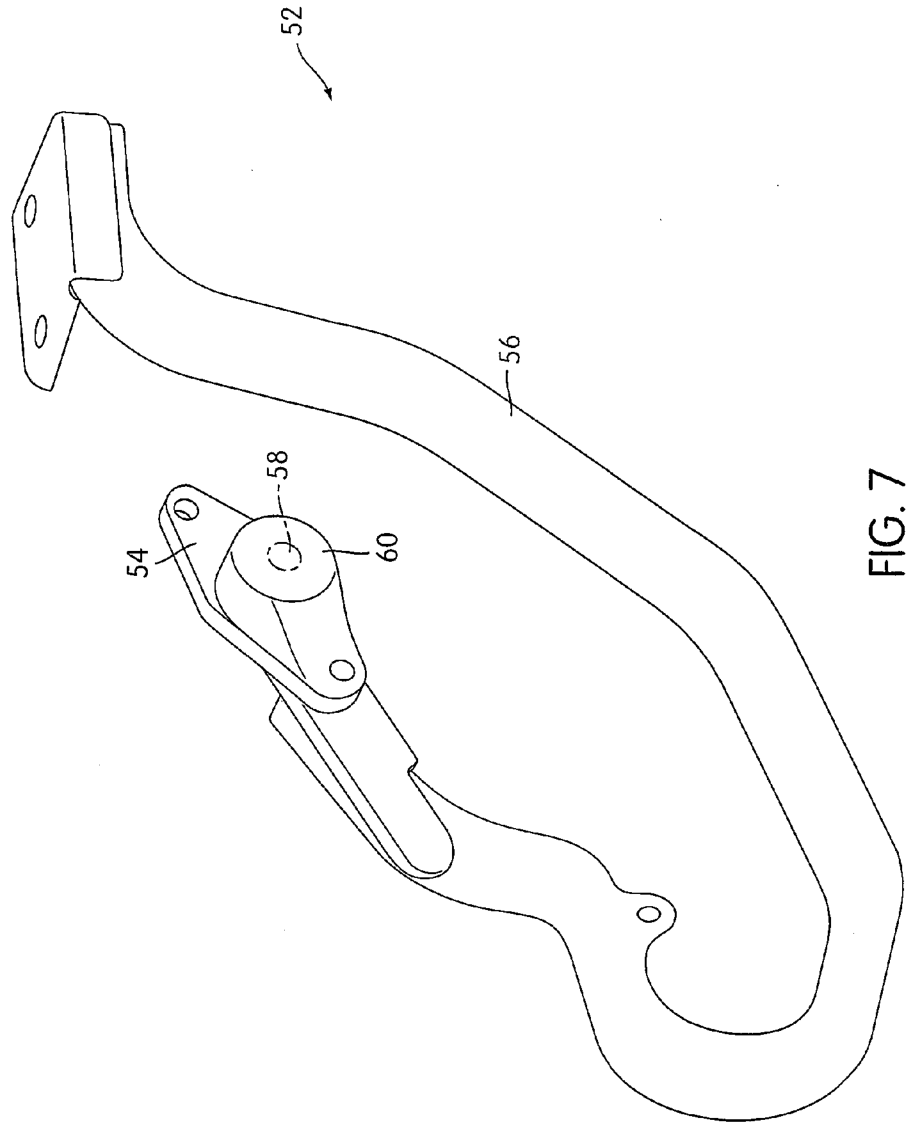
FIG. 7 is a perspective view of a viscous damper applied to a tube arm trunk hinge in accordance with an embodiment of the present invention.

FIG. 7 shows a viscous damper applied to a tube arm trunk hinge 52 in accordance with an embodiment of the invention. The tube arm trunk hinge 52 hingedly connects a trunk lid (not shown) of the vehicle to the vehicle body (not shown) for permitting the pivoting of the trunk lid about a horizontal axis to access the inner, rear part of the vehicle. The hinge 52 comprises a body bracket 54 and a trunk lid bracket 56. A hinge pin 58 pivotally connects the brackets 54, 56 to one another for opening and closing movements of the trunk, and is fixed to the trunk lid bracket 56. The body bracket 54 is constructed to be mounted to the vehicle body and the trunk lid bracket 56 is constructed to be mounted to the trunk lid of the vehicle. A viscous damper 60 is attached to the hinge pin 58 and body bracket 54 in the same manner as the embodiment of FIG. 5 to control the velocity of the trunk lid. For example, a viscous damper having a structure and operation as described above can be used in the tube arm trunk hinge. The viscous damper 60 can also be used in combination with the spring storage devices such as extension springs, torque rod springs, etc. to provide both lift assist and velocity control to the trunk.

Figure 8:
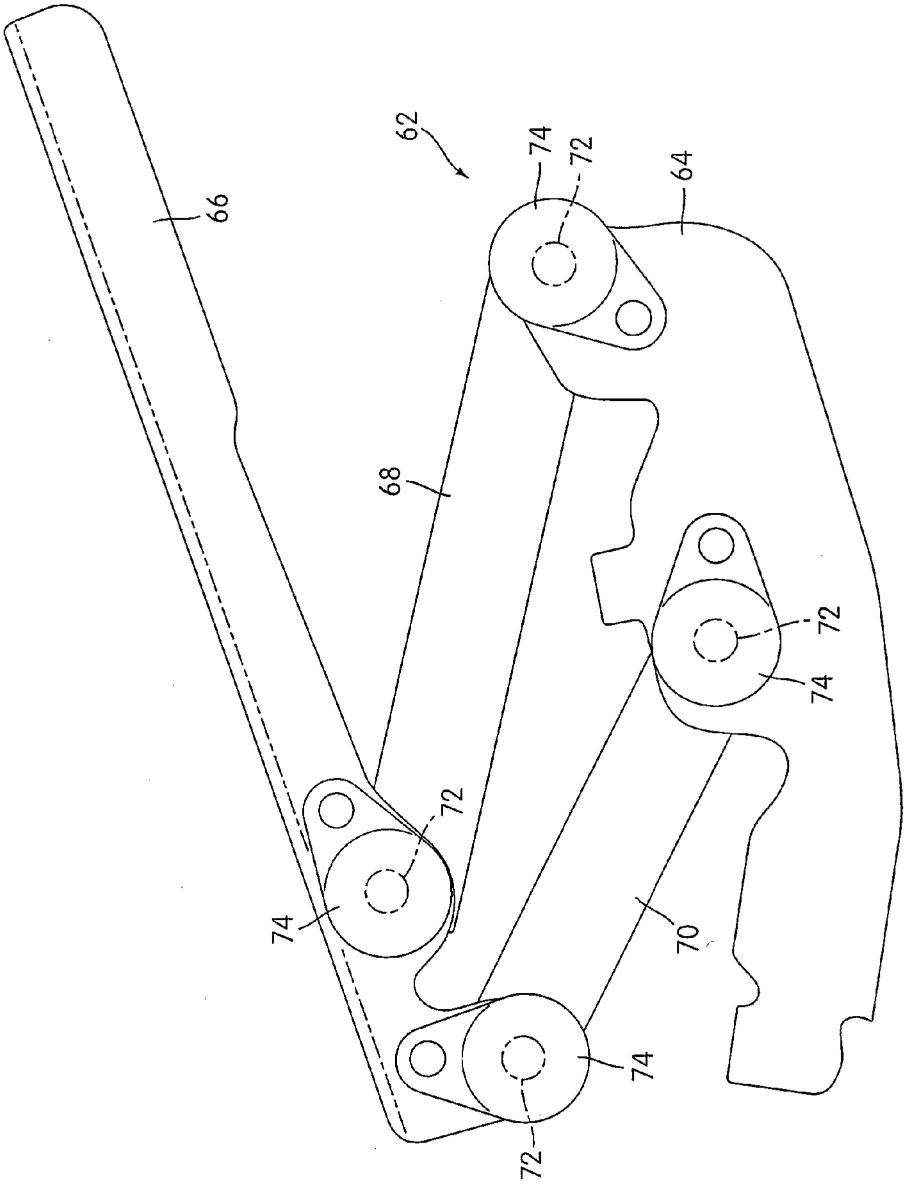
FIG. 8 is a side view of a viscous damper applied to a four-bar trunk hinge in accordance with an embodiment of the present invention.

FIG. 8 shows a viscous damper applied to a four bar hinge 62 in accordance with an embodiment of the invention. The four bar hinge 62 hingedly connects a trunk lid or engine compartment hood (not shown) of the vehicle to the vehicle body (not shown) for permitting the pivoting of the trunk lid or hood to access the inner part of the vehicle. The hinge 62 comprises a first member 64, a second member 66, a third member 68 and a fourth member 70. The second member 66 is pivotably coupled to the first member 64 via the third and the fourth members 68, 70 so that the second member 66 may move in an articulating manner with respect to the first member 64. The first member 64 connects to the motor vehicle body, such as a rear frame member, and pivotally connects to the third member 68 and the fourth member 70. The second member 66 is connected to the trunk lid, the hood or other part of the vehicle that is pivoted, and is connected to the opposite ends of the other members 68 and 70. Third member 68 extends between the first and second members 64 and 66 and pivots at one end to the first member 64. The fourth member 70 extends between the first and the second members 64 and 66 and pivots at one end to the first member 64 via a pivot coupling 72.

Viscous dampers 74 may be attached directly to the pivot couplings, which connect the first member 64, the second member 66, the third member 68 and the fourth member 70 to each other. The viscous damper 74 controls the velocity of the trunk lid, the hood or other part of the vehicle that is pivoted. For example, the pivot coupling 72 may be a pin fixed on the fourth member 70. The pin would couple to the rotor 14 by insertion into the opening 128 and the damper cover 12 would be fixed to the first member 64. Thus, rotation of the pin is dampened by the movement of the rotor 14 through the fluid 22 in the cover 12. Because all the members in a four bar linkage move together, a single damper can provide control for the entire linkage. The damper may be connected at any of the pivotal connections, and may be connected at single or multiple pivotal connections (as illustrated). For example, a viscous damper having a structure and operation as described above can be used in the four bar hinge. The viscous damper 74 can also be used in combination with the spring storage devices such as extension springs, torque rod springs etc. to provide both the lift assist and velocity control to the trunk. The hinge 62 is described in detail in the U.S. application Ser. No. 11/675,164, which is incorporated by reference herein in its entirety.

Figure 9:
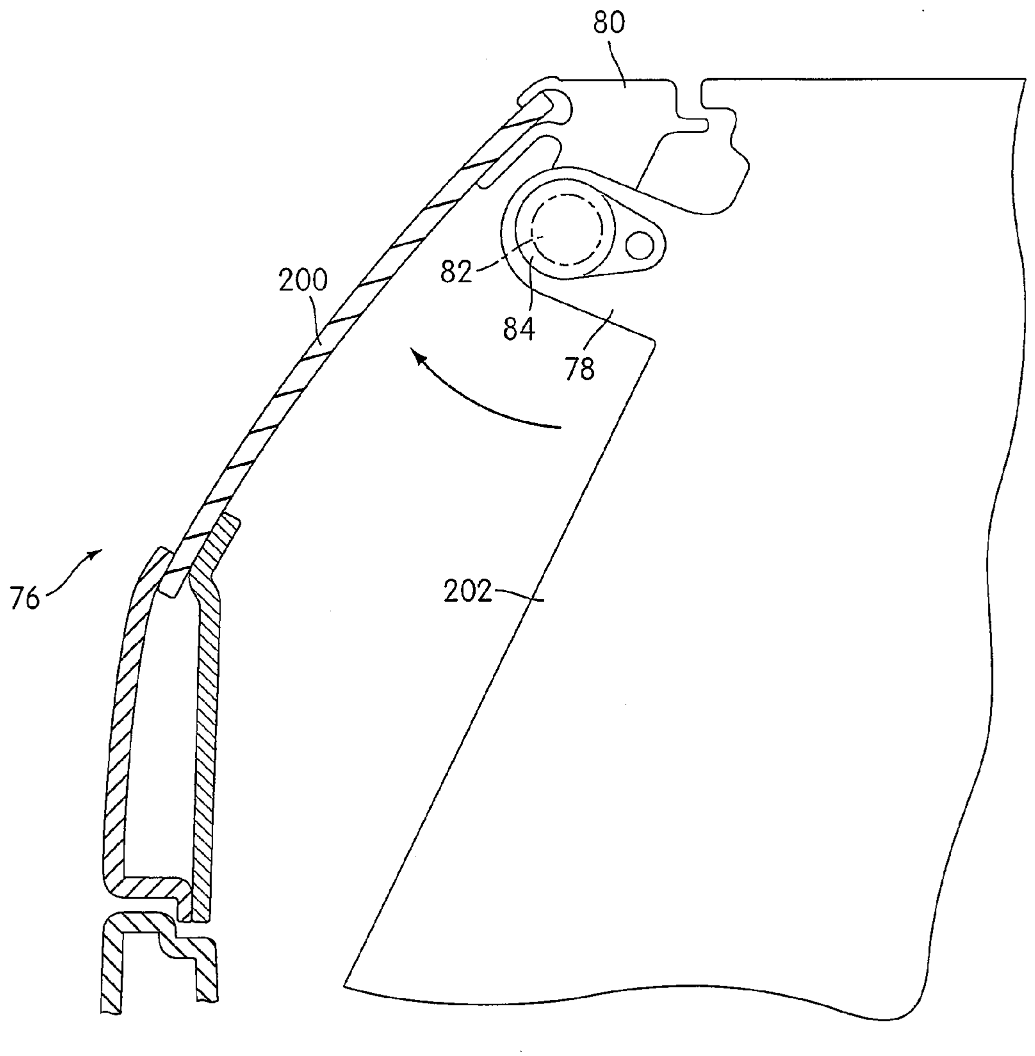
FIG. 9 is a side view of a viscous damper applied to a liftgate hinge in accordance with an embodiment of the present invention.

FIG. 9 shows a viscous damper applied to a liftgate hinge 76 in accordance with an embodiment of the invention. The liftgate hinge 76 hingedly connects a liftgate 200 of the vehicle to the vehicle body 202 for permitting the pivoting of the liftgate about a horizontal axis to access the inner, rear part of the vehicle. The hinge 76 comprises a body bracket 78 and a liftgate bracket 80. A hinge pin 82 pivotally connects the brackets 78, 80 to one another for opening and closing movements of the liftgate 200, and is connected to the body bracket 70 The body bracket 78 is constructed to be mounted to the vehicle body 202 and the liftgate bracket 80 is constructed to be mounted to the liftgate 200 of the vehicle. A viscous damper 84 is attached to the hinge pin 82 and the body bracket 78 in the same manner as the embodiment of FIG. 5 to control the velocity of the liftgate 200. For example, a viscous damper having a structure and operation as described above can be used in the liftgate hinge. The viscous damper 84 can also be used in combination with the spring storage devices such as extension springs, torque rod springs etc. to provide both lift assist and velocity control to the liftgate.

Figure 10:
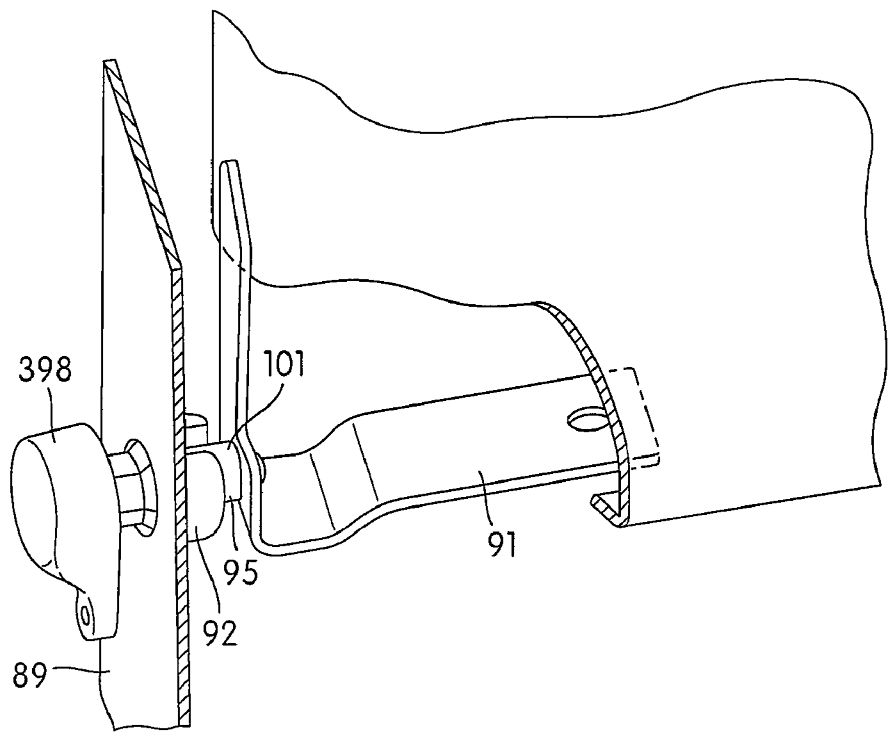
FIG. 10 is an exploded view of a viscous damper applied to a tailgate hinge in accordance with an embodiment of the present invention.
Figure 11:
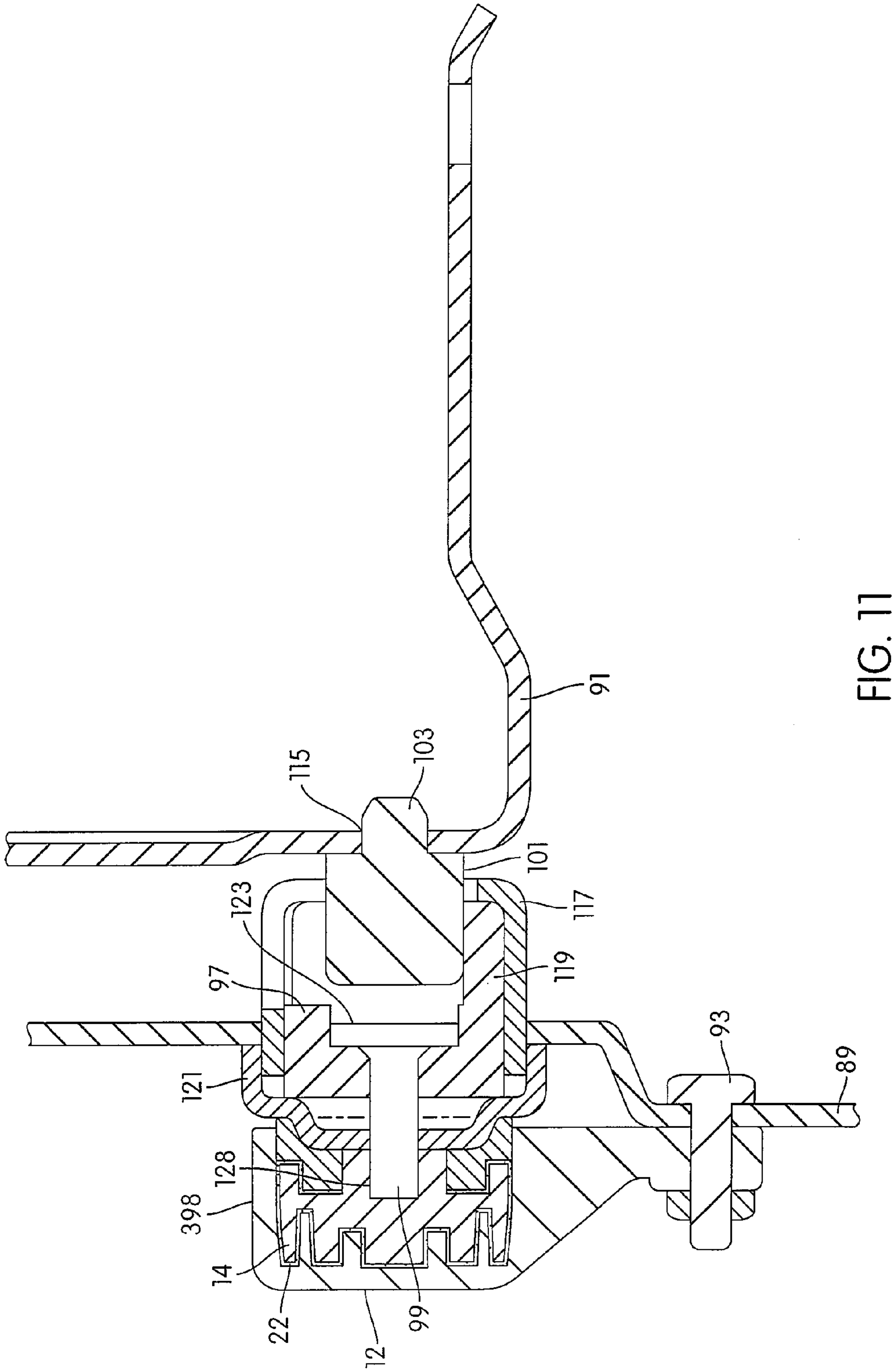
FIG. 11 is a cross sectional view of a viscous damper applied to the tailgate hinge in accordance with an embodiment of the present invention.

In one embodiment, a tailgate mounting assembly includes a pair of hinge assemblies or mechanisms, each located on opposite ends of the tailgate. The hinge mechanisms are constructed to be pivotally mounted to the tailgate for the movement about a pivot axis between a raised closed position extending generally vertically and a lowered open position extending generally horizontally. FIG. 10 shows a variation where viscous damper 398 is applied to one of the tailgate hinge assemblies. FIG. 11 shows a cross sectional view of this variation.

As shown in FIGS. 10 and 11, the tailgate bracket 91 is connected to the tailgate and the body bracket 89 is connected to the side walls of the truck bed. In one embodiment, the body bracket 89 may be in the form of the side wall of the truck bed, but preferably it is a separate bracket that attaches to the wall by fasteners, welding, etc. A hinge pin 101 is connected to the tailgate bracket 91, by inserting a portion 103 thereof into an opening 115 located on the tailgate bracket 91. A pivoting connection member 97 is placed in the opening located in a cup shaped member 117 provided on the second body bracket 89. The connection member 97 pivots within the cup shaped member 117, and the cup shaped member 117 has a slot for receiving the pin 101. As a result, connection member 97 is pivotally fixed to and pivots with pin 101 in the cup shaped member 117 as the tailgate pivots. The pin 101 rests on a bottom wall 119 of the connection member 97. The outer end of the cup shaped member 117 is inserted through an opening in the bracket 89. A smaller cup 121 is engaged in an overlapping fashion with the end of cup shaped member 117. The overlapping portions are secured (such as by threaded attachment, welding, etc.), which prevents the cup shaped member 117 from being withdrawn axially inwardly from the bracket opening. The smaller cup 121 may be secured to the bracket 89 by welding or any other fastening as would be apparent to one skilled in the art.

The housing of the damper 10 is secured to the smaller cup 121 by welding or any other suitable fastening, and a bend in bracket 89 provides clearance for the placement of the smaller cup 121. A pin 99 is then used to connect the connection member 97 with the viscous damper 398 attached to the body bracket 89. The outer end of the pin 99 couples with the rotor of the viscous damper 398, and a bolt 93, is used to attach the cover 14 of the viscous damper 398 to the body bracket 89. The pin 99 has a non-circular head 123 received in a recess in the connection member 97, which pivotally fixes the pin to the connection member 97. Therefore, the rotor 14 of the damper 10 is pivotally fixed to the tailgate as it opens and closes. Thus, the rotor 14 moves with the pin 99 and the tailgate bracket 91 (while the cover 12 stays fixed on the body bracket 89), and the fluid 22 in the damper 398 helps control the velocity of the tailgate. In one embodiment, a viscous damper having a structure and operation as described above can be used in the trunk hinge. As an option, the viscous damper 398 can also be used in combination with the spring storage devices such as torque rod springs to provide both lift assist and velocity control to the trunk. In one embodiment, the other of the tailgate hinge assemblies that is located on the opposite end of the tailgate is constructed in same manner as described in U.S. Application Publication No. 2003/0189354, the entirety of which is hereby incorporated herein. In one embodiment, this tailgate hinge assembly does not include a viscous damper.

Figure 12:
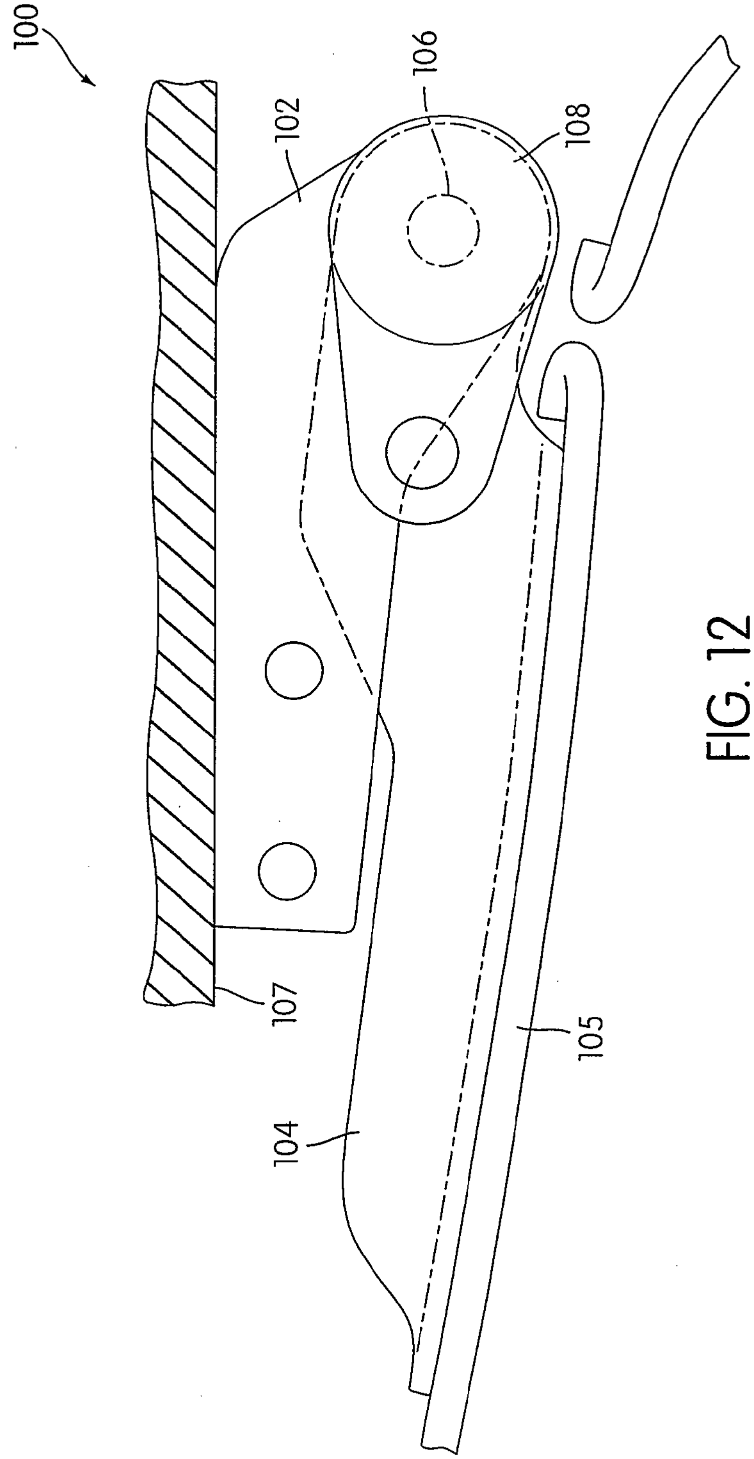
FIG. 12 is a top, view of a viscous damper applied to a single pivot hood hinge in accordance with an embodiment of the present invention.

FIG. 12 shows a viscous damper applied to a single pivot hood hinge 100 in accordance with an embodiment of the invention. The hood hinge 100 hingedly connects the hood 105 of the vehicle to the vehicle body 107 for permitting the pivoting of the hood about a horizontal axis to access the inner, front part of the vehicle. The hinge 100 comprises a body bracket 102 and a hood bracket 104. A hinge pin 106 pivotally connects the brackets 102, 104 to one another for opening and closing movements of the hood 105, and is fixed to the body bracket 102. The body bracket 102 is constructed to be mounted to the vehicle body 107, such as a front frame member (not shown), and the hood bracket 104 is constructed to be mounted to the hood 105 of the vehicle. A viscous damper 108 is attached to the hinge pin 106 and the body bracket 102 in the same manner as the embodiment of FIG. 5 to control the velocity of the hood. For example, a viscous damper having a structure and operation as described above can be used in the single pivot hood hinge. The viscous damper 108 can also be used in combination with the spring storage devices such as extension springs, torque rod springs etc. to provide both lift assist and velocity control to the hood.

FIGS. 16-20 show another embodiment where a rotary viscous damper 150 applied to a tailgate hinge 152. This embodiment is similar to the embodiment described above with reference to FIGS. 10 and 11. The tailgate hinge 152 is utilized to pivotally mount a tailgate 151 to a vehicle body 154, such as side walls of the truck bed. The hinge 152 may include a tailgate bracket 156, a hinge pin 158, a connection member 160, a connection or an interface shaft 162, and a rotary viscous damper 150. In one embodiment, the hinge 152 may also include a tapping plate 164 and a connection member housing 166. In one embodiment, an optional lift assist mechanism comprising a torsion bar or torque rod (not shown) is adapted to assist in supporting the weight of the tailgate 151 during its movement from a fully opened position to fully a closed position. The torque rod (not shown) has one end coupled to the tailgate bracket 156 by a clamp (not shown). The hinge system is described in detail in the U.S. Provisional Application No. 60/780,858, which is incorporated by reference herein in its entirety.

The tailgate bracket 156 is connected to the tailgate 151. The shaft or hinge pin 158 is fixedly connected to the tailgate bracket 156 by inserting a portion 168 thereof into an opening 170 located on the tailgate bracket 156. In one embodiment, the shaft or hinge pin 158 may have an elliptical cross-section and the portion 168 may have a circular cross-section. The connection member housing 166 includes a support member 174 and two flanges 172 extending from an outer end 175 of the support member 174. In one embodiment, the support member 174 is in the form of a cylinder member 174. The support member 174 is constructed to support the weight of the tailgate 151 and transfer it to the vehicle body, thus, preventing the weight of the tailgate 151 from being transferred to the damper 150. The two flanges 172 are constructed to connect the connection member housing 166 to the vehicle body 154 to establish such support. In one embodiment, each flange 172 includes a bolt receiving opening 176 constructed to receive fastener (not shown) to connect the connection member housing 166 to the vehicle body 154, as would be appreciated by one skilled in the art. In one embodiment, the cylinder member 174 may be in the form of a cup-shaped member. The tailgate bracket 156 and hinge pin/shaft 158 may be regarded as a first hinge member 155 constructed to be mounted to the tailgate 151. The tapping plate 164 and connection member housing 166 may be regarded as a second hinge member 157 constructed to be mounted to the vehicle body 154.

Figure 17:
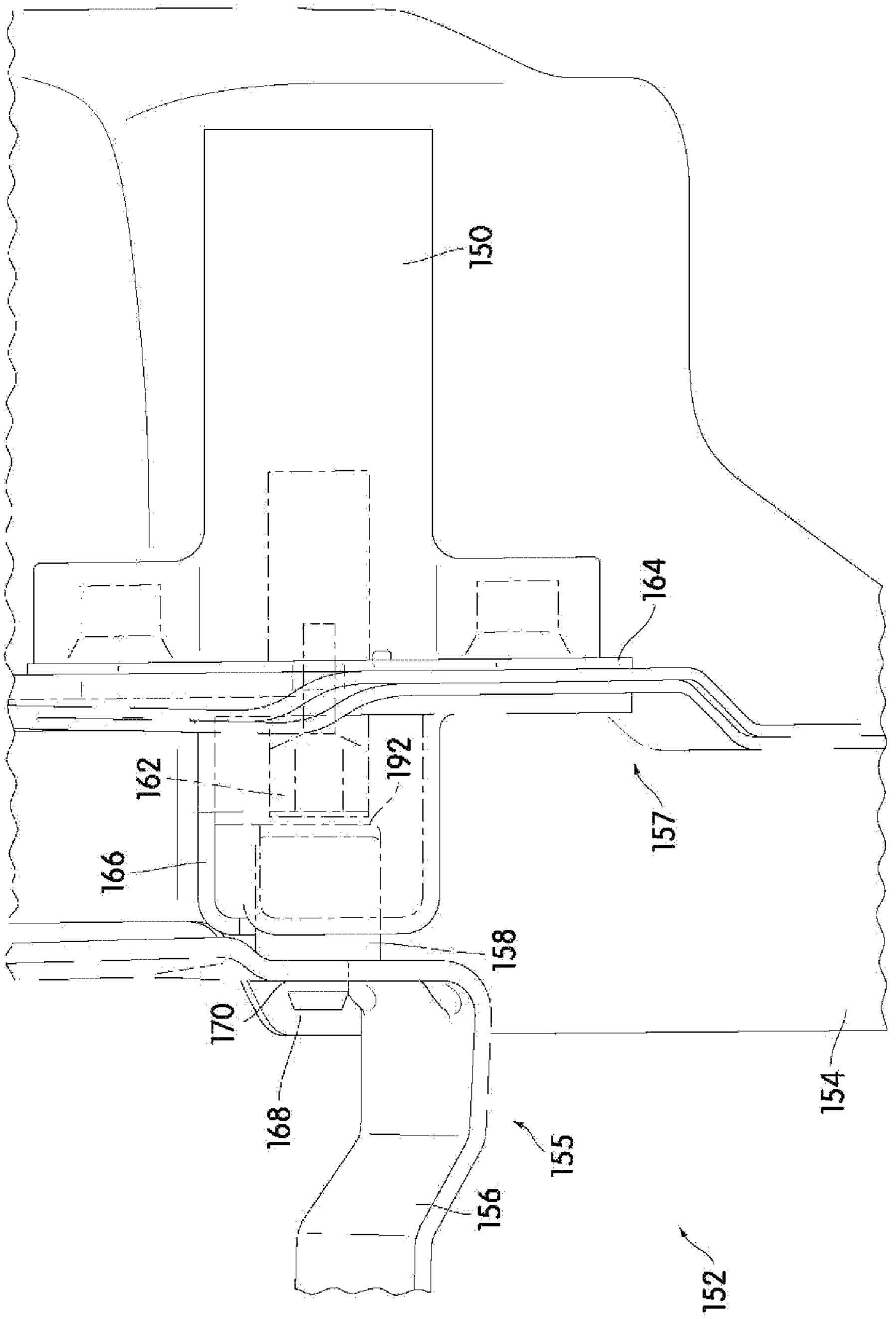
FIG. 17 is a front view of the viscous damper applied to the tailgate hinge as shown in FIG. 16 in accordance with an embodiment of the present invention.
Figure 18:
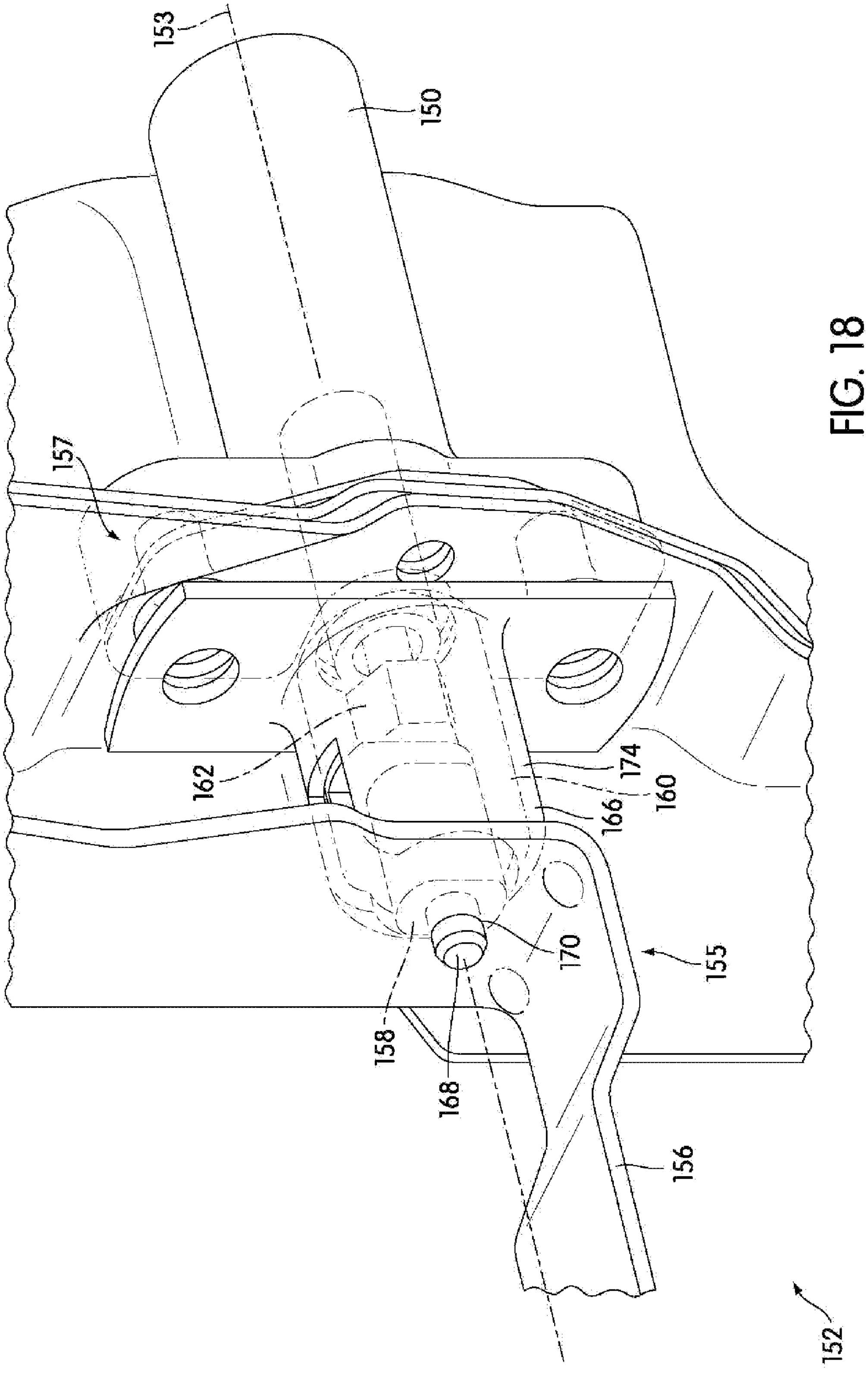
FIG. 18 is a left side perspective view of the viscous damper applied to the tailgate hinge as shown in FIG. 16 in accordance with an embodiment of the present invention.
Figure 19:
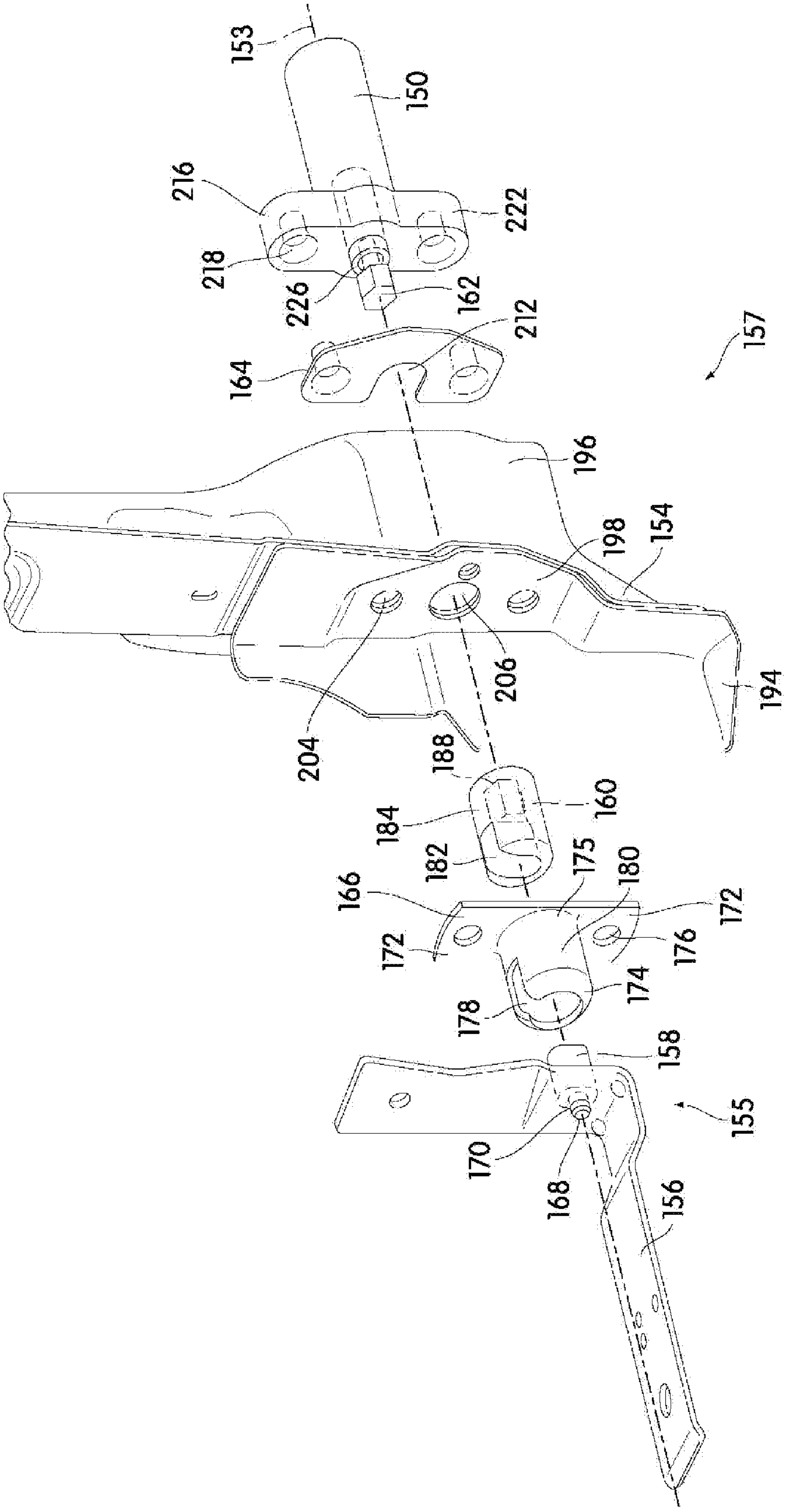
FIG. 19 is a left side exploded perspective view of the viscous damper applied to the tailgate hinge as shown in FIG. 16 in accordance with an embodiment of the present invention.
Figure 20:
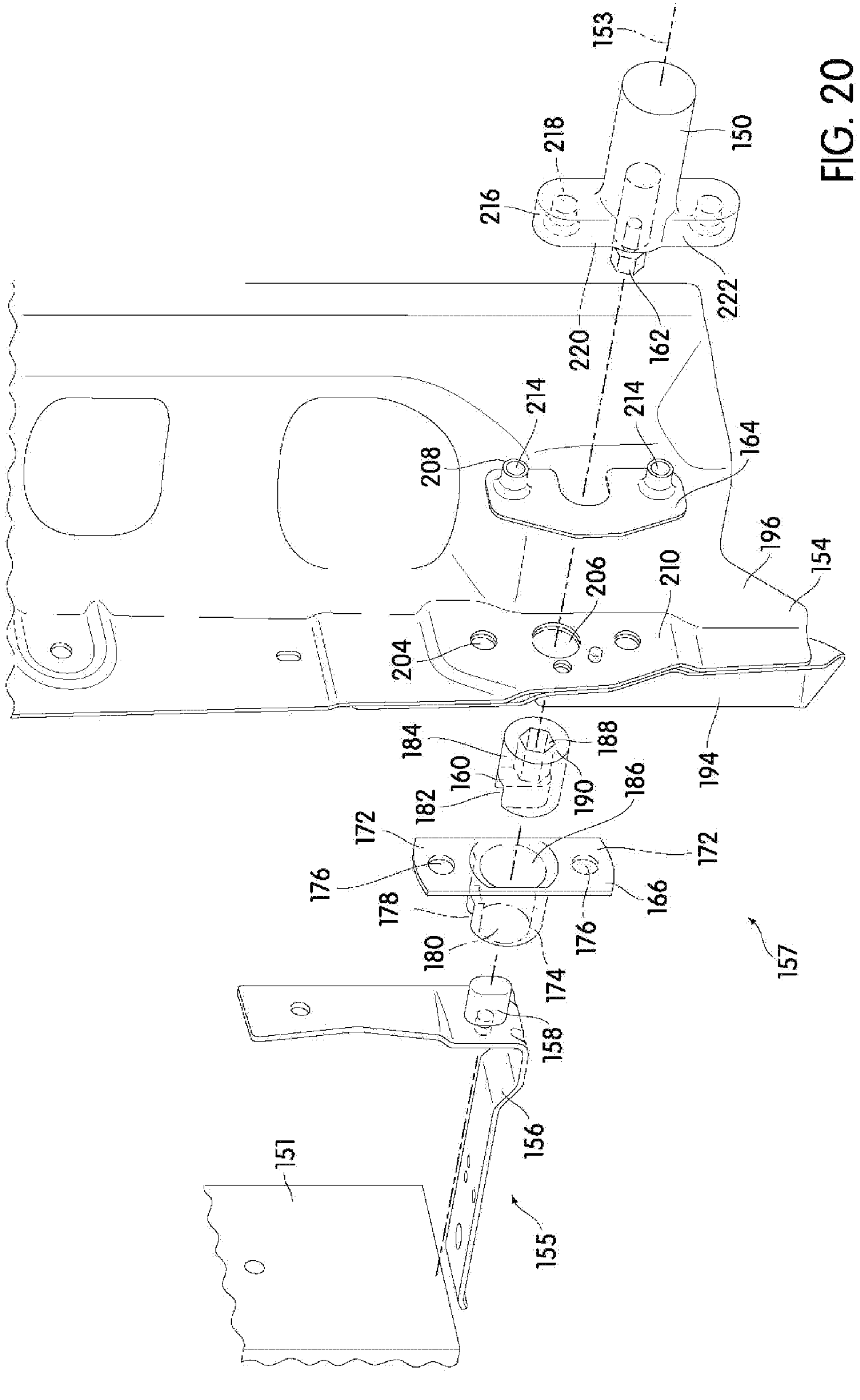
FIG. 20 is a right side exploded perspective view of the viscous damper applied to the tailgate hinge as shown in FIG. 16 in accordance with an embodiment of the present invention.

The connection member 160 is accommodated in an opening 186 located in the cylinder member 174 of the connection member housing 166. In one embodiment, the connection member 160 is completely accommodated within the connection member housing 166. In one embodiment, the connection member 160 may be in the made from powder metal overmoulded with nylon. The cylinder member 174 of the connection member housing 166 may include a notch or a groove 178, located on an upper surface 180 of the connection member housing 166. The connection member 160 may also include a corresponding notch or a groove 182, located on an upper surface 184 of the connection member 160. The notch 178 of the connection member housing 166 circumferentially aligns with the notch 182 of the connection member 160 to receive the shaft or hinge pin 158 therewithin in a radial direction. The connection member 160 may include an outwardly facing opening 188 located on an outer side 190, which is opposite to the connection member housing 166. The opening 188 is constructed to receive the interface or connection shaft 162. In one embodiment, as shown in FIG. 17, the connection member 160 may include a wall 192 constructed to separate the shaft 158 from the connection shaft 162, where both shaft 158 and the connection shaft 162 are accommodated in the connection member 160. In one embodiment, the connection member 160 and the connection shaft 162 may be in the form of a one-piece integrally formed member, instead of being two separate members.

The vehicle body 154 may include a first member 194 and a second member 196 each joined to each other by welding, adhesive bonding, or by any other fastening mechanism as would be appreciated by one skilled in the art. In one embodiment, the first vehicle body member 194 may be a L-shaped member having a depression 198, which is constructed to receive the connection member housing 166. Also, the second vehicle body member 196 may be a L-shaped member having a bump 210 constructed to receive the tapping plate 164. The depression 198 and the bump 210 fit together so that the body 154 has a double layer of material. A pair of bolt receiving openings 204 through both body members 194, 196 is constructed to align with the bolt receiving opening 176 of the connection member housing 166 to connect the connection member housing 166 with the vehicle body 154. A connection shaft receiving opening 206 through both body members 194, 196 is constructed to receive the connection shaft 162. The pair of bolt receiving openings 204 is constructed to align with bolt receiving openings 208 of the tapping plate 164 to connect the damper 150 and the tapping plate 164 with the vehicle body 154. In one embodiment, the tapping plate 164 may be connected to the second vehicle body member 196, for example, by spot welding. The connection shaft receiving opening 206 is constructed to receive the connection shaft 162.

The tapping plate 164 may include a cutout region 212 to accommodate the connection shaft 162, and a pair of extrusions 214 located on opposing sides of the tapping plate 164. Each extrusion 214 may be include the bolt receiving opening 208.

The viscous damper 150 may include a rotor, a cover 222, a viscous material, and an opening 226. The cover 222 is constructed to fixedly connect the viscous damper 150 to the second vehicle body member 196. The rotor is rotatably supported within the cover 222. The viscous material is disposed in a space between the cover 222 and the rotor. The opening 226 is located about a center axis of the rotor to accommodate the connection shaft 162. The viscous damper 150 may include attachment flanges 216 located on opposing sides of the viscous damper 150. Each damper flange 216 may include an opening 218 constructed to fit over the tapping plate extrusions 214. In the illustrated embodiment, two attachment flanges 216 are used to connect the viscous damper 150 to the tapping plate 164 and then to the vehicle body 154. However, it should be appreciated that in another embodiment, the rotary viscous damper may include only one damper flange to connect the viscous damper 150 to the tapping plate 164 and the vehicle body 154.

Preferably, the each set of openings 176, 204, 208, and 218 all align so that a single bolt or fastener can provide the connection through each set.

The operation of the hinge 152 is explained with reference to FIGS. 16-20. When the tailgate 151 is moved about a pivot axis 153 between a raised closed position extending generally vertically and a lowered open position extending generally horizontally, the shaft 158 attached to the tailgate bracket 156 is likewise pivoted. The rotational force from the shaft 158 is transferred to the connection member 160, which is constructed to rotate within the cylinder member 174 of the connection member housing 166. As the connection member 160 rotates, the connection member 160 transfers the rotational force from the shaft 158 to the connection shaft 162. The connection shaft 162 transfers the rotational force to the rotor of the viscous damper 150, thus, causing the rotor to rotate and to generate a relative motion between the cover 222 and the rotor of the viscous damper 150. The relative shearing motion generates a damping force or a shear resistance. These shear forces developed by the rotating surfaces through the viscous material generate a resistance torque. The shock of the tailgate is absorbed by the resistance torque generated by the viscous damper 150.

In one embodiment, the rotary viscous damper 150 may be placed within the vehicle body 154, thus, may be invisible from outside. In one embodiment, the viscous damper 150 may be installed only on passenger's or right side hinge assembly of the tailgate 151. In this embodiment, the driver's or left side hinge assembly of the tailgate may not change with the introduction of the rotary viscous damper. In one embodiment, a one-way viscous damper may be used so that its damping direction is the opening direction. In this embodiment, the close assist of the tailgate will not be affected by the introduction of the rotary viscous damper. In one embodiment, the tailgate may rotate 180 degrees into the open position without any negative effect of the viscous damper.

FIG. 21 shows a variation of the tube arm hinge shown in FIG. 7. As noted above, a tube arm hinge 550 hingedly connects a decklid (not shown) of the vehicle to the vehicle body (not shown) for permitting the pivoting of the decklid about a horizontal axis to access the inner, rear part of the vehicle. The tube arm hinge 550 comprises a decklid bracket 552, a body bracket 554, and a shaft or hinge pin 556. In one embodiment, the decklid bracket 552 may have a tubular cross-section. In one embodiment, the body bracket 554 may include a first arm 558 and a second arm 560, where the first arm 558, and the second arm 560 are constructed to be located on either side of the decklid bracket 552. The hinge pin 556 pivotally connects the decklid bracket 552, the first arm 558 and the second arm 560 for opening and closing movements of the decklid, and is fixed to the decklid bracket 552. In one embodiment, the hinge pin 556 is fixedly connected to the decklid bracket 552 using welding. In another embodiment, the hinge pin 556 is fixedly connected to the decklid bracket 552 using anti-rotation features, such as mating non-circular cross-sections. It is contemplated that any other attaching mechanisms, as would be appreciated by one skilled in the art, may be used to connect the decklid bracket 552 and the hinge pin 556. In one embodiment, the hinge pin 556 may be connected to the first arm 558 and the second arm 560 using bushings 562. In one embodiment, the bushings 562 may include an opening 564 therethrough to receive the hinge pin 256.

A viscous damper 568 may include a rotor, a cover 572, viscous material, and an opening. The cover 572 is constructed to fixedly connect the viscous damper 568 to the second arm 560. The rotor is rotatably supported within the cover 572. The viscous material is disposed in a space between the cover 572 and the rotor. The opening is located about a center axis of the rotor to accommodate the shaft 556. As noted in the previous embodiment, the viscous damper 568 may include double flanges 578 to connect the cover 572 of the viscous damper 568 to the second arm 560. However, it should be appreciated that in another embodiment, the rotary viscous damper 568 may include only one damper flange to connect the viscous damper 568 to the second arm 560.

The operation of the hinge 550 is explained with reference to FIG. 21. When the decklid (not shown) is moved about a pivot axis (e.g. horizontal axis) between a raised open position and a lowered closed position, the rotational force is transmitted to the shaft 556 attached to the decklid bracket 552. The shaft 556 transfers the rotational force to the rotor of the viscous damper 568, thus, causing the rotor to rotate and to generate a relative motion between the cover 572 and the rotor of the viscous damper 568. This viscous fluid, in turn, resists this motion so as to provide a dampening effect. In one embodiment, the viscous damper 568, may provide one way dampening, that is the viscous damper 568 dampens during closing, but does not provide dampening during opening.

In the context of the illustrated embodiment, certain components have been described as being on the movable panel such as door, tailgate, liftgate, trunk, hood, etc. bracket or the body bracket. However, the locations of these components can be reversed, and thus the illustrated embodiment is not intended to be limiting. The term bracket is a generic structural term that refers to any structure that attaches the hinge to an object, and the above described brackets are provided solely as an example, and should not be regarded as limiting. The brackets may have any construction or configuration as would be apparent to one skilled in the art. The brackets are stamped from a piece of sheet metal, but may be formed in any suitable manner. The brackets may be attached to the vehicle body or may be attached to the vehicle door, trunk, liftgate, tailgate or hood by using welding or any type of mechanical fasteners as would be apparent to one skilled in the art. The above described hinges may be used in tandem with another hinge or hinges, and that other hinges may have the same or a different construction from the above described hinges. Any suitable connection may be used to connect the parts of a damper to the parts of the hinge or vehicle and closure, and the connections discussed herein should not be regarded as limiting.

It should be noted that orientational references, such as “upper”, “lower”, “right”, “left”, and the like are used for convenience purposes to refer to the orientation with respect to the Figures. These terms are not intended to be limiting, and in practice the various structures may have other orientations.

Any patents or applications referred to in this application, including any in the Background section, are incorporated into, the present application.

The foregoing illustrated embodiment(s) has or have been provided solely for illustrating the structural and functional principles of the present invention, and should not be regarded as limiting.

What is claimed is:

1. An assembly to pivotally connect a tailgate to a vehicle body, the assembly comprising:

a viscous rotary damper; and a pair of hinge mechanisms on opposing sides of the tailgate, the hinge mechanisms constructed to be pivotally mounted to the tailgate for the movement about a pivot axis between a raised closed position extending generally vertically and a lowered open position extending generally horizontally; wherein at least one of the pair of hinge mechanisms comprises:

a first hinge member constructed to be mounted to the tailgate;

a second hinge member constructed to be mounted to the vehicle body;

a connection member constructed to connect to the tailgate and to pivot with the tailgate, and to connect with the viscous damper; and a support member on the second hinge member, the support member being constructed to pivotally receive the connection member so as to allow the connection member to pivot with the tailgate, thus allowing for pivotal movement of the tailgate and support of its weight;

wherein the viscous damper comprises a cover constructed to be fixed relative to the second hinge member; a rotor rotatably supported within the cover; and a viscous material disposed in a space between the cover and the rotor, and wherein the connection member connects to the rotor to enable rotation of the tailgate between the closed position and the open position to rotate the rotor relative to the cover of the viscous damper to provide a resistance torque that controls the velocity of the tailgate.

2. An assembly according to claim 1, wherein the first hinge member includes a shaft, the shaft and the connection member being constructed to be connected together to connect the connection member to the tailgate.

3. An assembly according to claim 2, wherein the support member has a radially facing opening and the connection member has a radially facing opening, the radially facing openings being configured to be circumferentially aligned to permit the shaft to be received radially in the connection member.

4. An assembly according to claim 1, wherein the connection member has an opening on an outer end thereof, and the viscous damper includes an interface shaft connected to the rotor, the interface shaft being configured to be received in the opening on the outer end of the connection member to connect the connection member and the rotor.

5. An assembly according to claim 1, further comprising a spring storage device to provide both lift assist and velocity control to the tailgate.

6. An assembly according to claim 1, wherein the viscous damper includes a seal, and a seal cover to prevent the leakage of the viscous material.

7. An assembly according to claim 1, wherein the viscous damper is a one-way damper, which provides significantly more damping effect in one rotary direction as opposed to other direction.

8. An assembly according to claim 1, wherein the viscous rotary damper comprises an opening to accommodate the shaft, and the opening is located about a center axis of the rotor.

* * * * *